US009214067B2

(12) United States Patent
Basallo et al.

(10) Patent No.: US 9,214,067 B2
(45) Date of Patent: Dec. 15, 2015

(54) GAMING SYSTEM AND METHOD FOR PROVIDING A STREAMING SYMBOLS GAME

(75) Inventors: Leandro Basallo, San Francisco, CA (US); Rachael A. Bristol, San Francisco, CA (US); Scott A. Caputo, Santa Clara, CA (US); Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 498 days.

(21) Appl. No.: 13/605,660

(22) Filed: Sep. 6, 2012

(65) Prior Publication Data

US 2014/0066162 A1 Mar. 6, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .................................... *G07F 17/326* (2013.01)

(58) Field of Classification Search
USPC ........................ 463/16, 17, 18, 19, 20, 22, 25
See application file for complete search history.

(56) References Cited

U.S. PATENT DOCUMENTS

| | | | |
|---|---|---|---|
| 2,077,124 | A | 4/1937 | Miller et al. |
| 2,476,580 | A | 7/1949 | Bergman |
| 2,585,268 | A | 2/1952 | Olsen |
| 3,309,092 | A | 3/1967 | Hardesty |
| 3,420,525 | A | 1/1969 | Waders |
| 3,533,629 | A | 10/1970 | Raven |
| 3,580,581 | A | 5/1971 | Raven |
| 3,642,287 | A | 2/1972 | Lally et al. |
| 3,645,531 | A | 2/1972 | Wright |
| 3,695,615 | A | 10/1972 | Shoptaugh |
| 3,735,987 | A | 5/1973 | Ohki |
| 3,770,269 | A | 11/1973 | Elder |
| 3,834,712 | A | 9/1974 | Cox |
| 3,937,565 | A | 2/1976 | Alasia |
| 4,092,654 | A | 5/1978 | Alasia |
| 4,099,722 | A | 7/1978 | Rodesch et al. |
| 4,170,358 | A | 10/1979 | Hancock |
| 4,180,271 | A | 12/1979 | McMurchie |
| 4,184,683 | A | 1/1980 | Hooker |
| 4,190,256 | A | 2/1980 | Rudden, Jr. |
| 4,198,052 | A | 4/1980 | Gauselmann |
| 4,200,291 | A | 4/1980 | Hooker |
| 4,326,351 | A | 4/1982 | Heywood et al. |

(Continued)

FOREIGN PATENT DOCUMENTS

| | | |
|---|---|---|
| AU | 50327/96 | 10/1997 |
| AU | 63553/98 | 10/1998 |

(Continued)

*Primary Examiner* — Adetokunbo O Torimiro

(74) *Attorney, Agent, or Firm* — Neal, Gerber & Eisenberg LLP

(57) ABSTRACT

In various embodiments, the gaming system disclosed herein provides streaming symbols game which utilizes a single continuous series or chain of symbols and a plurality of symbol display positions which form a path. Specifically, in various embodiments, the gaming system displays the chain of symbols continuously moving through the path of symbol display positions wherein which symbols are evaluated for any awards corresponds to when the chain of symbols stops moving along the path.

29 Claims, 18 Drawing Sheets

(56) References Cited

U.S. PATENT DOCUMENTS 4,346,900 A 8/1982 Lamlee
4,448,419 A 5/1984 Telnaes
4,492,378 A 1/1985 Williams
4,508,345 A 4/1985 Okada
4,582,324 A 4/1986 Koza et al.
4,593,904 A 6/1986 Graves
4,614,344 A 9/1986 O'Connor
4,618,150 A 10/1986 Kimura
4,624,459 A 11/1986 Kaufman
4,636,951 A 1/1987 Harlick
4,648,600 A 3/1987 Oliges
4,669,731 A 6/1987 Clarke
4,695,053 A 9/1987 Vazquez, Jr. et al.
4,712,799 A 12/1987 Fraley
4,732,386 A 3/1988 Rayfiel
4,756,531 A 7/1988 DiRe et al.
4,790,537 A 12/1988 Smyth et al.
4,826,169 A 5/1989 Bessho et al.
4,836,546 A 6/1989 DiRe et al.
4,838,552 A 6/1989 Hagiwara
4,874,173 A 10/1989 Kishishita
4,991,848 A 2/1991 Greenwood et al.
5,019,973 A 5/1991 Wilcox et al.
5,042,809 A 8/1991 Richardson
5,085,436 A 2/1992 Bennett
5,092,598 A 3/1992 Kamille
5,100,137 A 3/1992 Fulton
5,102,134 A 4/1992 Smyth
5,102,137 A 4/1992 Ekiert
5,116,055 A 5/1992 Tracy
5,127,651 A 7/1992 Okada
5,152,529 A 10/1992 Okada
5,163,131 A 11/1992 Row et al.
5,167,413 A 12/1992 Fulton
5,178,390 A 1/1993 Okada
5,184,821 A 2/1993 Korenek
5,188,363 A 2/1993 Marnell, II et al.
5,205,555 A 4/1993 Hamano
RE34,244 E 5/1993 Hagiwara
5,209,479 A 5/1993 Nagao et al.
5,251,897 A 10/1993 Fulton
5,259,616 A 11/1993 Bergmann
5,265,877 A 11/1993 Boylan et al.
5,277,424 A 1/1994 Wilms
5,280,916 A 1/1994 Gleason, Jr.
5,292,127 A 3/1994 Kelly et al.
5,308,065 A 5/1994 Bridgeman et al.
5,324,040 A 6/1994 Panda
5,332,228 A 7/1994 Schultz
5,342,035 A 8/1994 Sugiyama et al.
5,342,047 A 8/1994 Heidel et al.
5,342,049 A 8/1994 Wichinsky et al.
5,344,144 A 9/1994 Canon
5,364,100 A 11/1994 Ludlow et al.
5,373,440 A 12/1994 Cohen et al.
5,393,061 A 2/1995 Manship et al.
5,395,111 A 3/1995 Inoue
5,397,125 A 3/1995 Adams
5,401,024 A 3/1995 Simunek
5,413,342 A 5/1995 Kaplan
5,423,539 A 6/1995 Nagao
5,431,408 A 7/1995 Adams
5,437,451 A 8/1995 Fulton
5,449,173 A 9/1995 Thomas et al.
5,456,465 A 10/1995 Durham
5,472,196 A 12/1995 Rusnak
5,494,294 A 2/1996 Cappetta
5,511,781 A 4/1996 Wood et al.
5,524,888 A 6/1996 Heidel
5,536,016 A 7/1996 Thompson
5,542,669 A 8/1996 Charron et al.
5,553,851 A 9/1996 Malavazos et al.
5,560,603 A 10/1996 Seelig et al.
5,564,700 A 10/1996 Celona
5,569,084 A 10/1996 Nicastro et al.
5,580,053 A 12/1996 Crouch
5,580,055 A 12/1996 Hagiwara
5,580,309 A 12/1996 Piechowiak et al.
5,584,763 A 12/1996 Kelly et al.
5,584,764 A 12/1996 Inoue
5,609,524 A 3/1997 Inoue
5,611,535 A 3/1997 Tiberio
5,630,586 A 5/1997 Lowden
5,639,089 A 6/1997 Matsumoto et al.
5,645,485 A 7/1997 Clapper, Jr.
5,647,798 A 7/1997 Falciglia
5,655,965 A 8/1997 Takemoto et al.
5,695,402 A 12/1997 Stupak
5,697,843 A 12/1997 Manship et al.
5,704,835 A 1/1998 Dietz, II
5,711,525 A 1/1998 Breeding
5,720,662 A 2/1998 Holmes, Jr. et al.
5,722,891 A 3/1998 Inoue
5,732,948 A 3/1998 Yoseloff
5,743,526 A 4/1998 Inoue
5,743,799 A 4/1998 Houriet et al.
5,752,881 A 5/1998 Inoue
5,755,619 A 5/1998 Matsumoto et al.
5,766,074 A 6/1998 Cannon et al.
5,769,458 A 6/1998 Carides et al.
5,769,716 A 6/1998 Saffari et al.
5,772,509 A 6/1998 Weiss
5,775,692 A 7/1998 Watts et al.
5,779,544 A 7/1998 Seelig et al.
5,779,549 A 7/1998 Walker et al.
5,788,573 A 8/1998 Baerlocher et al.
5,791,989 A 8/1998 Slinkman
5,807,172 A 9/1998 Piechowiak
5,810,361 A 9/1998 Kadlic
5,816,916 A 10/1998 Moody
5,817,172 A 10/1998 Yamada et al.
5,823,873 A 10/1998 Moody
5,823,874 A 10/1998 Adams
5,833,536 A 11/1998 Davids et al.
5,833,537 A 11/1998 Barrie
5,848,932 A 12/1998 Adams
5,851,010 A 12/1998 Feinberg
5,851,148 A 12/1998 Brune et al.
5,855,514 A 1/1999 Kamille
5,868,392 A 2/1999 Kraft
5,879,235 A 3/1999 Kaneko et al.
5,882,259 A 3/1999 Holmes, Jr. et al.
5,882,261 A 3/1999 Adams
5,885,158 A 3/1999 Torango et al.
5,890,962 A 4/1999 Takemoto
5,902,184 A 5/1999 Bennett et al.
5,910,048 A 6/1999 Feinberg
5,911,418 A 6/1999 Adams
5,919,088 A 7/1999 Weiss
5,927,714 A 7/1999 Kaplan
5,931,467 A 8/1999 Kamille
5,935,002 A 8/1999 Falciglia
5,947,820 A 9/1999 Morro et al.
5,951,397 A 9/1999 Dickinson
5,954,335 A 9/1999 Moody
5,967,893 A 10/1999 Lawrence et al.
5,971,849 A 10/1999 Falciglia
5,976,016 A 11/1999 Moody et al.
5,980,384 A 11/1999 Barrie
5,984,781 A 11/1999 Sunaga
5,984,782 A 11/1999 Inoue
5,993,316 A 11/1999 Coyle et al.
5,996,997 A 12/1999 Kamille
5,997,400 A 12/1999 Seelig et al.
5,997,401 A 12/1999 Crawford
6,004,207 A 12/1999 Wilson, Jr. et al.
6,004,208 A 12/1999 Takemoto et al.
6,012,982 A 1/2000 Piechowialt et al.
6,012,983 A 1/2000 Walker et al.
6,015,344 A 1/2000 Kelly et al.
6,015,346 A 1/2000 Bennett
6,019,374 A 2/2000 Breeding
6,027,115 A 2/2000 Griswold et al.
6,033,307 A 3/2000 Vancura

(56) References Cited

U.S. PATENT DOCUMENTS

| | | | |
|---|---|---|---|
| 6,039,649 | A | 3/2000 | Schulze |
| 6,045,129 | A | 4/2000 | Cooper |
| 6,047,963 | A | 4/2000 | Pierce et al. |
| 6,050,895 | A | 4/2000 | Luciano, Jr. et al. |
| 6,053,813 | A | 4/2000 | Mathis |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,077,163 | A | 6/2000 | Walker et al. |
| 6,082,734 | A | 7/2000 | Uehara et al. |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,095,921 | A | 8/2000 | Walker et al. |
| 6,102,400 | A | 8/2000 | Scott et al. |
| 6,102,798 | A | 8/2000 | Bennett |
| 6,105,962 | A | 8/2000 | Malavazos et al. |
| 6,110,041 | A | 8/2000 | Walker et al. |
| 6,110,043 | A | 8/2000 | Olsen |
| 6,113,098 | A | 9/2000 | Adams |
| 6,117,009 | A | 9/2000 | Yoseloff |
| 6,117,013 | A | 9/2000 | Eiba |
| 6,120,031 | A | 9/2000 | Adams |
| 6,120,377 | A | 9/2000 | McGinnis, Sr. et al. |
| 6,120,378 | A | 9/2000 | Moody et al. |
| 6,123,333 | A | 9/2000 | McGinnis, Sr. et al. |
| 6,126,542 | A | 10/2000 | Fier |
| 6,129,632 | A | 10/2000 | Luciano |
| 6,135,885 | A | 10/2000 | Lermusiaux |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,165,070 | A | 12/2000 | Nolte et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,429 | B1 | 3/2001 | Demar et al. |
| 6,203,430 | B1 | 3/2001 | Walker et al. |
| 6,210,276 | B1 | 4/2001 | Mullins |
| 6,210,277 | B1 | 4/2001 | Stefan |
| 6,213,877 | B1 | 4/2001 | Walker et al. |
| 6,217,448 | B1 | 4/2001 | Olsen |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,237,913 | B1 | 5/2001 | Kamille |
| 6,238,287 | B1 | 5/2001 | Komori et al. |
| 6,238,288 | B1 | 5/2001 | Walker et al. |
| 6,241,607 | B1 | 6/2001 | Payne et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,261,128 | B1 | 7/2001 | Heim et al. |
| 6,261,177 | B1 | 7/2001 | Bennett |
| 6,261,178 | B1 | 7/2001 | Bennett |
| 6,267,669 | B1 | 7/2001 | Luciano, Jr. et al. |
| 6,270,409 | B1 | 8/2001 | Shuster |
| 6,270,411 | B1 | 8/2001 | Gura et al. |
| 6,270,412 | B1 | 8/2001 | Crawford et al. |
| 6,283,474 | B1 | 9/2001 | de Keller |
| 6,287,194 | B1 | 9/2001 | Okada |
| 6,288,993 | B1 | 9/2001 | Kawahara et al. |
| 6,290,600 | B1 | 9/2001 | Glasson |
| 6,293,866 | B1 | 9/2001 | Walker et al. |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,302,791 | B1 | 10/2001 | Frohm et al. |
| 6,309,298 | B1 | 10/2001 | Gerow |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,331 | B1 | 11/2001 | Tamaki |
| 6,312,334 | B1 | 11/2001 | Yoseloff |
| 6,315,563 | B1 | 11/2001 | Sager |
| 6,315,660 | B1 | 11/2001 | DeMar et al. |
| 6,315,662 | B1 | 11/2001 | Jorasch et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher et al. |
| 6,322,078 | B1 | 11/2001 | Adams |
| 6,322,309 | B1 | 11/2001 | Thomas et al. |
| 6,328,649 | B1 | 12/2001 | Randall et al. |
| 6,331,143 | B1 | 12/2001 | Yoseloff |
| 6,334,814 | B1 | 1/2002 | Adams |
| 6,334,864 | B1 | 1/2002 | Amplatz et al. |
| 6,336,860 | B1 | 1/2002 | Webb |
| 6,336,862 | B1 | 1/2002 | Byrne |
| 6,340,158 | B2 | 1/2002 | Pierce et al. |
| 6,343,988 | B1 | 2/2002 | Walker et al. |
| 6,346,043 | B1 | 2/2002 | Colin et al. |
| 6,347,996 | B1 | 2/2002 | Gilmore et al. |
| RE37,588 | E | 3/2002 | Ornstein |
| 6,358,144 | B1 | 3/2002 | Kaddlic et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,364,767 | B1 | 4/2002 | Brossard et al. |
| 6,364,768 | B1 | 4/2002 | Acres et al. |
| 6,368,216 | B1 | 4/2002 | Hedrick et al. |
| 6,375,187 | B1 | 4/2002 | Baerlocher |
| 6,375,567 | B1 | 4/2002 | Acres |
| 6,375,570 | B1 | 4/2002 | Poole |
| 6,386,974 | B1 | 5/2002 | Adams |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,409,172 | B1 | 6/2002 | Vancura |
| 6,409,597 | B1 | 6/2002 | Mizumoto |
| 6,409,602 | B1 | 6/2002 | Wiltshire et al. |
| 6,413,160 | B1 | 7/2002 | Vancura |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,428,412 | B1 | 8/2002 | Anderson et al. |
| 6,435,502 | B2 | 8/2002 | Matos |
| 6,439,943 | B1 | 8/2002 | Aoki et al. |
| 6,439,993 | B1 | 8/2002 | O'Halloran |
| 6,439,995 | B1 | 8/2002 | Hughs-Baird et al. |
| 6,443,837 | B1 | 9/2002 | Jaffe et al. |
| 6,450,883 | B1 | 9/2002 | O'Halloran |
| 6,454,266 | B1 | 9/2002 | Breeding et al. |
| 6,454,651 | B1 | 9/2002 | Yoseloff |
| 6,460,856 | B2 | 10/2002 | Davies |
| 6,461,241 | B1 | 10/2002 | Webb et al. |

(56) References Cited

U.S. PATENT DOCUMENTS

| | | | |
|---|---|---|---|
| 6,464,581 | B1 | 10/2002 | Yoseloff et al. |
| 6,464,582 | B1 | 10/2002 | Baerlocher et al. |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,494,454 | B2 | 12/2002 | Adams |
| 6,494,785 | B1 | 12/2002 | Gerrard et al. |
| 6,500,068 | B2 | 12/2002 | Walker et al. |
| 6,501,899 | B1 | 12/2002 | Marrs et al. |
| 6,506,116 | B1 | 1/2003 | Sunaga et al. |
| 6,506,118 | B1 | 1/2003 | Baerlocher et al. |
| 6,511,375 | B1 | 1/2003 | Kaminkow |
| 6,514,141 | B1 | 2/2003 | Kaminkow et al. |
| 6,517,432 | B1 | 2/2003 | Jaffe |
| 6,517,433 | B2 | 2/2003 | Loose et al. |
| 6,522,312 | B2 | 2/2003 | Ohshima et al. |
| 6,533,658 | B1 | 3/2003 | Walker et al. |
| 6,533,660 | B2 | 3/2003 | Seelig et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,703 | B1 | 4/2003 | Bussick et al. |
| 6,558,254 | B2 | 5/2003 | Baelocher et al. |
| 6,561,899 | B2 | 5/2003 | Vancura |
| 6,561,900 | B1 | 5/2003 | Baerlocher et al. |
| 6,561,904 | B2 | 5/2003 | Loche et al. |
| 6,565,433 | B1 | 5/2003 | Baerlocher et al. |
| 6,569,016 | B1 | 5/2003 | Baerlocher |
| 6,572,471 | B1 | 6/2003 | Bennett |
| 6,572,472 | B1 | 6/2003 | Glavich |
| 6,572,473 | B1 | 6/2003 | Baerlocher |
| 6,581,935 | B1 | 6/2003 | Odom |
| 6,582,307 | B2 | 6/2003 | Webb |
| 6,592,457 | B1 | 7/2003 | Frohm et al. |
| 6,595,854 | B2 | 7/2003 | Hughs-Baird et al. |
| 6,599,785 | B2 | 7/2003 | Hamada et al. |
| 6,602,136 | B1 | 8/2003 | Baerlocher et al. |
| 6,602,137 | B2 | 8/2003 | Kaminkow et al. |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,607,438 | B2 | 8/2003 | Baerlocher et al. |
| 6,609,791 | B1 | 8/2003 | Miyamoto et al. |
| 6,609,971 | B2 | 8/2003 | Vancura |
| 6,616,142 | B2 | 9/2003 | Adams |
| 6,626,758 | B1 | 9/2003 | Parham et al. |
| 6,632,139 | B1 | 10/2003 | Baerlocher |
| 6,632,141 | B2 | 10/2003 | Webb et al. |
| 6,634,945 | B2 | 10/2003 | Glavich et al. |
| 6,638,164 | B2 | 10/2003 | Randall et al. |
| 6,641,477 | B1 | 11/2003 | Dietz, II |
| 6,645,073 | B2 | 11/2003 | Lemay et al. |
| 6,648,754 | B2 | 11/2003 | Baerlocher et al. |
| 6,648,758 | B2 | 11/2003 | Bennett et al. |
| 6,666,765 | B2 | 12/2003 | Vancura |
| 6,669,559 | B1 | 12/2003 | Baerlocher et al. |
| 6,672,960 | B1 | 1/2004 | Jensen |
| 6,676,126 | B1 | 1/2004 | Walker et al. |
| 6,676,511 | B2 | 1/2004 | Payne et al. |
| 6,676,512 | B2 | 1/2004 | Fong et al. |
| 6,676,516 | B2 | 1/2004 | Baerlocher et al. |
| 6,688,977 | B1 | 2/2004 | Baerlocher et al. |
| 6,692,356 | B2 | 2/2004 | Baerlocher et al. |
| 6,702,673 | B2 | 3/2004 | Webb |
| 6,719,630 | B1 | 4/2004 | Seelig et al. |
| 6,722,976 | B2 | 4/2004 | Adams |
| 6,722,981 | B2 | 4/2004 | Kaminkow et al. |
| 6,722,982 | B2 | 4/2004 | Kaminkow et al. |
| 6,726,562 | B2 | 4/2004 | Vancura |
| 6,731,313 | B1 | 5/2004 | Kaminkow |
| 6,733,386 | B2 | 5/2004 | Cuddy et al. |
| 6,746,016 | B2 | 6/2004 | Perrie et al. |
| 6,746,328 | B2 | 6/2004 | Cannon et al. |
| 6,746,329 | B1 | 6/2004 | Duhamel |
| 6,749,502 | B2 | 6/2004 | Baerlocher |
| 6,749,504 | B2 | 6/2004 | Hughs-Baird |
| 6,752,717 | B2 | 6/2004 | Vancura |
| 6,761,632 | B2 | 7/2004 | Bamsemer et al. |
| 6,761,633 | B2 | 7/2004 | Riendeau et al. |
| 6,764,398 | B2 | 7/2004 | Stone et al. |
| 6,769,983 | B2 | 8/2004 | Slomiany |
| 6,769,986 | B2 | 8/2004 | Vancura |
| 6,780,103 | B2 | 8/2004 | Bansemer et al. |
| 6,780,107 | B2 | 8/2004 | Baerlocher et al. |
| 6,783,455 | B2 | 8/2004 | Glavich |
| 6,783,457 | B2 | 8/2004 | Hughs-Baird et al. |
| 6,786,818 | B1 | 9/2004 | Rothschild et al. |
| 6,786,820 | B2 | 9/2004 | Gerrard et al. |
| 6,805,349 | B2 | 10/2004 | Baerlocher et al. |
| 6,808,454 | B2 | 10/2004 | Gerrard et al. |
| 6,811,482 | B2 | 11/2004 | Letovsky |
| 6,817,944 | B2 | 11/2004 | Kaminkow et al. |
| 6,824,465 | B2 | 11/2004 | Luciano et al. |
| 6,840,858 | B2 | 1/2005 | Adams |
| 6,843,722 | B2 | 1/2005 | Webb |
| 6,843,723 | B2 | 1/2005 | Joshi |
| 6,852,027 | B2 | 2/2005 | Kaminkow et al. |
| 6,852,028 | B2 | 2/2005 | Vancura |
| 6,855,053 | B2 | 2/2005 | Baerlocher |
| 6,855,054 | B2 | 2/2005 | White et al. |
| 6,855,055 | B2 | 2/2005 | Perrie et al. |
| 6,863,606 | B1 | 3/2005 | Berg et al. |
| 6,869,357 | B2 | 3/2005 | Adams et al. |
| 6,875,106 | B2 | 4/2005 | Weiss et al. |
| 6,875,108 | B1 | 4/2005 | Hughs-Baird |
| 6,878,061 | B2 | 4/2005 | Baerlocher et al. |
| 6,893,341 | B2 | 5/2005 | Walker et al. |
| 6,896,615 | B2 | 5/2005 | Berman |
| 6,896,617 | B2 | 5/2005 | Daly |
| 6,899,620 | B2 | 5/2005 | Kaminkow et al. |
| 6,899,622 | B2 | 5/2005 | Lind et al. |
| 6,905,406 | B2 | 6/2005 | Kaminkow et al. |
| 6,908,383 | B2 | 6/2005 | Baerlocher et al. |
| 6,910,962 | B2 | 6/2005 | Marks et al. |
| 6,918,830 | B2 | 7/2005 | Baerlocher |
| 6,918,832 | B2 | 7/2005 | Baerlocher et al. |
| 6,918,834 | B2 | 7/2005 | Vancura |
| 6,926,273 | B1 | 8/2005 | Vancura |
| 6,929,545 | B2 | 8/2005 | Vancura |
| 6,929,952 | B2 | 8/2005 | Baerlocher |
| 6,932,701 | B2 | 8/2005 | Glavich et al. |
| 6,935,947 | B1 | 8/2005 | Singer et al. |
| 6,939,229 | B2 | 9/2005 | McClintic |
| 6,942,568 | B2 | 9/2005 | Baerlocher |
| 6,958,013 | B2 | 10/2005 | Mireau et al. |
| 6,960,133 | B1 | 11/2005 | Marks et al. |
| 6,964,416 | B2 | 11/2005 | McClintic et al. |
| 6,966,833 | B2 | 11/2005 | Kaminkow et al. |
| 6,966,835 | B2 | 11/2005 | Graham |
| 6,971,953 | B2 | 12/2005 | Gerrard et al. |
| 6,981,635 | B1 | 1/2006 | Hughs-Baird et al. |
| 6,984,174 | B2 | 1/2006 | Cannon et al. |
| 6,986,711 | B2 | 1/2006 | Vancura |
| 6,988,732 | B2 | 1/2006 | Vancura |
| 6,988,947 | B2 | 1/2006 | Baerlocher et al. |
| 6,988,948 | B2 | 1/2006 | Perrie et al. |
| 6,991,539 | B2 | 1/2006 | Pacey |
| 6,997,805 | B2 | 2/2006 | Vancura |
| 7,001,274 | B2 | 2/2006 | Baerlocher et al. |
| 7,014,560 | B2 | 3/2006 | Glavich et al. |
| 7,037,191 | B2 | 5/2006 | Rodgers et al. |
| 7,040,983 | B2 | 5/2006 | Dolloff et al. |
| 7,040,984 | B2 | 5/2006 | Mead |
| 7,056,192 | B2 | 6/2006 | Venigalla et al. |
| 7,056,210 | B2 | 6/2006 | Bansemer et al. |
| 7,056,214 | B2 | 6/2006 | Miereau et al. |
| 7,059,967 | B2 | 6/2006 | Baerlocher |
| 7,070,503 | B2 | 7/2006 | Rudolph |
| 7,073,793 | B2 | 7/2006 | Vancura |
| 7,077,744 | B2 | 7/2006 | Cannon |
| 7,086,945 | B2 | 8/2006 | Vancura |
| 7,104,888 | B2 | 9/2006 | Miereau et al. |
| 7,108,602 | B2 | 9/2006 | Daly |
| 7,112,136 | B2 | 9/2006 | Anderson et al. |

(56) References Cited

U.S. PATENT DOCUMENTS 7,112,137 B2 9/2006 Baerlocher et al.
7,121,942 B2 10/2006 Baerlocher
7,128,646 B2 10/2006 Baerlocher et al.
7,128,647 B2 10/2006 Muir
7,144,322 B2 12/2006 Gomez et al.
7,156,736 B2 1/2007 Adams et al.
7,160,186 B2 1/2007 Cuddy et al.
7,160,188 B2 1/2007 Kaminkow et al.
7,172,506 B2 2/2007 Baerlocher et al.
7,175,521 B2 2/2007 McClintic
7,175,524 B2 2/2007 Bansemer et al.
7,182,689 B2 2/2007 Hughs-Baird et al.
7,192,343 B2 3/2007 Vancura
7,192,347 B1 3/2007 Marks et al.
7,217,187 B2 5/2007 Vancura
7,229,350 B2 6/2007 Baerlocher et al.
7,234,700 B2 6/2007 Vancura
7,235,011 B2 6/2007 Randall et al.
7,247,096 B2 7/2007 Vancura
7,252,591 B2 8/2007 Van Asdale
7,264,545 B2 9/2007 Maya et al.
7,273,415 B2 9/2007 Cregan et al.
7,294,055 B2 11/2007 Baerlocher et al.
7,300,348 B2 11/2007 Kaminkow et al.
7,303,469 B2 12/2007 Kaminkow
7,314,409 B2 1/2008 Maya et al.
7,316,609 B2 1/2008 Dunn et al.
7,326,115 B2 2/2008 Baerlocher
7,335,102 B2 2/2008 Baerlocher et al.
7,338,367 B2 3/2008 Kaminkow et al.
7,338,369 B2 3/2008 Miereau et al.
7,341,512 B2 3/2008 Dolloff et al.
7,351,141 B2 4/2008 Rodgers et al.
7,351,144 B2 4/2008 Daly
7,361,089 B2 4/2008 Daly et al.
7,371,174 B2 5/2008 Baerlocher
7,377,849 B2 5/2008 Baerlocher et al.
7,399,226 B2 7/2008 Mishra
7,402,103 B2 7/2008 Baerlocher
7,413,510 B2 8/2008 Schlegel et al.
7,419,431 B2 9/2008 Gauselmann et al.
7,431,645 B2 10/2008 Han et al.
7,448,948 B2 11/2008 Hughs-Baird et al.
7,481,435 B2 1/2009 Shetterly
7,488,250 B2 2/2009 Baerlocher et al.
7,494,412 B2 2/2009 Baerlocher
7,541,252 B2 6/2009 Eun et al.
7,544,129 B2 6/2009 Baerlocher
7,556,561 B2 7/2009 White et al.
7,578,136 B2 8/2009 Derouineau et al.
7,578,735 B2 8/2009 Frizzell et al.
7,611,406 B2 11/2009 Fuller
7,654,895 B2 2/2010 Pacey
7,674,176 B2 3/2010 Berman et al.
7,708,627 B2 5/2010 Lind
7,717,787 B2 5/2010 Walker et al.
7,749,068 B2 7/2010 Cuddy et al.
7,841,936 B2 11/2010 Berman et al.
7,850,519 B2 12/2010 Majima et al.
7,874,910 B2 1/2011 Berman
7,922,573 B2 4/2011 Baerlocher et al.
7,927,204 B2 4/2011 DeBrabander, Jr. et al.
8,007,358 B2 8/2011 Linard et al.
8,137,176 B2 3/2012 Bernard et al.
8,221,206 B2 7/2012 Marks et al.
8,414,377 B1 * 4/2013 White .............................. 463/16
8,529,333 B2 9/2013 Berman et al.
8,641,505 B2 * 2/2014 Spark-Stahl et al. ........... 463/20
2001/0009865 A1 7/2001 DeMar et al.
2001/0024970 A1 9/2001 McKee et al.
2001/0038178 A1 11/2001 Vancura
2001/0040341 A1 11/2001 Kamille
2001/0041610 A1 11/2001 Luciano et al.
2001/0054794 A1 12/2001 Cole et al.
2002/0014740 A1 2/2002 Ainsworth
2002/0025844 A1 2/2002 Casey et al.
2002/0052232 A1 5/2002 Kaminkow
2002/0052233 A1 5/2002 Gauselmann
2002/0053089 A1 5/2002 Massey
2002/0055382 A1 5/2002 Meyer
2002/0058545 A1 5/2002 Luciano
2002/0065124 A1 5/2002 Ainsworth
2002/0077165 A1 6/2002 Bansemer et al.
2002/0077172 A1 6/2002 Uchiyam et al.
2002/0086725 A1 7/2002 Fasbender et al.
2002/0094857 A1 7/2002 Meyer
2002/0119814 A1 8/2002 Fong et al.
2002/0147040 A1 10/2002 Walker et al.
2002/0198039 A1 12/2002 Marks et al.
2003/0013518 A1 1/2003 Graham
2003/0017867 A1 1/2003 DeKeller
2003/0017868 A1 1/2003 Crawford
2003/0027624 A1 2/2003 Gilmore et al.
2003/0045345 A1 3/2003 Berman
2003/0054874 A1 3/2003 Kaminkow
2003/0054875 A1 3/2003 Marks et al.
2003/0057645 A1 3/2003 Baerlocher et al.
2003/0060267 A1 3/2003 Glavich et al.
2003/0060271 A1 3/2003 Gilmore et al.
2003/0064786 A1 4/2003 Weiss
2003/0069068 A1 4/2003 Kaminkow
2003/0073480 A1 4/2003 Thomas et al.
2003/0087687 A1 5/2003 Locke et al.
2003/0092480 A1 5/2003 White et al.
2003/0114215 A1 6/2003 Adams et al.
2003/0130024 A1 7/2003 Darby
2003/0130028 A1 7/2003 Aida et al.
2003/0153375 A1 8/2003 Vancura
2003/0157981 A1 8/2003 Marks et al.
2003/0176210 A1 9/2003 Vancura
2003/0181234 A1 9/2003 Falciglia, Sr.
2003/0186737 A1 10/2003 Bennett et al.
2003/0190942 A1 10/2003 Kaminkow et al.
2003/0190945 A1 10/2003 Bussick et al.
2003/0195028 A1 10/2003 Glavich
2003/0203752 A1 10/2003 Kaminkow et al.
2003/0207710 A1 11/2003 Rodgers et al.
2003/0211881 A1 11/2003 Walker et al.
2003/0216165 A1 11/2003 Singer et al.
2004/0009803 A1 1/2004 Bennett et al.
2004/0014521 A1 1/2004 Seelig et al.
2004/0018872 A1 1/2004 Baerlocher et al.
2004/0018874 A1 1/2004 Bonney et al.
2004/0023714 A1 2/2004 Asdale
2004/0033829 A1 2/2004 Pacey et al.
2004/0036212 A1 2/2004 Walker et al.
2004/0038727 A1 2/2004 Aida
2004/0043809 A1 3/2004 Gomez et al.
2004/0048646 A1 3/2004 Visocnik
2004/0048649 A1 3/2004 Peterson et al.
2004/0048650 A1 3/2004 Mierau et al.
2004/0048651 A1 3/2004 Vorias
2004/0053657 A1 3/2004 Fiden et al.
2004/0053662 A1 3/2004 Pacey
2004/0053665 A1 3/2004 Baerlocher
2004/0058727 A1 3/2004 Marks et al.
2004/0067790 A1 4/2004 Peterson et al.
2004/0082374 A1 4/2004 Maya et al.
2004/0082378 A1 4/2004 Peterson et al.
2004/0092299 A1 5/2004 Gauselmann
2004/0097280 A1 5/2004 Gauselmann
2004/0102238 A1 5/2004 Taylor
2004/0106444 A1 6/2004 Cuddy et al.
2004/0106445 A1 6/2004 Perrie et al.
2004/0137981 A1 7/2004 Gauselmann et al.
2004/0162133 A1 8/2004 Jackson
2004/0176156 A1 9/2004 Walker et al.
2004/0185927 A1 9/2004 Baerlocher et al.
2004/0192431 A1 9/2004 Singer et al.
2004/0195773 A1 10/2004 Masci et al.
2004/0204223 A1 10/2004 Cuddy et al.
2004/0217548 A1 11/2004 Snow
2004/0232616 A1 11/2004 English
2004/0242313 A1 12/2004 Munoz

(56) References Cited

U.S. PATENT DOCUMENTS

| | | | |
|---|---|---|---|
| 2004/0242314 | A1 | 12/2004 | Casey |
| 2004/0248639 | A1 | 12/2004 | Slomiany |
| 2004/0266509 | A1 | 12/2004 | Bennett et al. |
| 2005/0009597 | A1 | 1/2005 | Daly |
| 2005/0014553 | A1 | 1/2005 | Byrne |
| 2005/0020351 | A1 | 1/2005 | Baerlocher et al. |
| 2005/0033461 | A1 | 2/2005 | Gerrard et al. |
| 2005/0040601 | A1 | 2/2005 | Yoseloff et al. |
| 2005/0043081 | A1 | 2/2005 | Baerlocher |
| 2005/0054405 | A1 | 3/2005 | Baerlocher et al. |
| 2005/0054415 | A1 | 3/2005 | Kaminkow et al. |
| 2005/0054416 | A1 | 3/2005 | Hostetler et al. |
| 2005/0054420 | A1 | 3/2005 | Cregan et al. |
| 2005/0054429 | A1 | 3/2005 | Baerlocher et al. |
| 2005/0054434 | A1 | 3/2005 | Baerlocher et al. |
| 2005/0054435 | A1 | 3/2005 | Rodgers et al. |
| 2005/0054436 | A1 | 3/2005 | Frizzell et al. |
| 2005/0059456 | A1 | 3/2005 | Mead et al. |
| 2005/0059461 | A1 | 3/2005 | Ching et al. |
| 2005/0071023 | A1 | 3/2005 | Gilliland et al. |
| 2005/0096123 | A1 | 5/2005 | Cregan et al. |
| 2005/0101372 | A1 | 5/2005 | Miereau et al. |
| 2005/0101378 | A1 | 5/2005 | Kaminkow et al. |
| 2005/0107154 | A1 | 5/2005 | Pacey |
| 2005/0124406 | A1 | 6/2005 | Cannon |
| 2005/0148384 | A1 | 7/2005 | Marks et al. |
| 2005/0164793 | A1 | 7/2005 | Merimovich et al. |
| 2005/0170876 | A1 | 8/2005 | Masci et al. |
| 2005/0181853 | A1 | 8/2005 | Baerlocher |
| 2005/0187011 | A1 | 8/2005 | Kaminkow |
| 2005/0192081 | A1 | 9/2005 | Marks et al. |
| 2005/0192091 | A1 | 9/2005 | Siewert et al. |
| 2005/0230917 | A1 | 10/2005 | Jackson |
| 2005/0239528 | A1 | 10/2005 | Moody |
| 2005/0245307 | A1 | 11/2005 | Gatto et al. |
| 2006/0003832 | A1 | 1/2006 | Mincey et al. |
| 2006/0025196 | A1 | 2/2006 | Webb et al. |
| 2006/0030387 | A1 | 2/2006 | Jackson |
| 2006/0030401 | A1 | 2/2006 | Mead et al. |
| 2006/0046836 | A1 | 3/2006 | Walker et al. |
| 2006/0058095 | A1 | 3/2006 | Berman et al. |
| 2006/0068882 | A1 | 3/2006 | Baerlocher et al. |
| 2006/0068883 | A1 | 3/2006 | Randall et al. |
| 2006/0068892 | A1 | 3/2006 | Gomez et al. |
| 2006/0073874 | A1 | 4/2006 | Cregan et al. |
| 2006/0084497 | A1 | 4/2006 | Marks et al. |
| 2006/0084500 | A1 | 4/2006 | Baerlocher et al. |
| 2006/0089191 | A1 | 4/2006 | Singer et al. |
| 2006/0121969 | A1 | 6/2006 | Marks et al. |
| 2006/0121978 | A1 | 6/2006 | Hornik et al. |
| 2006/0183528 | A1 | 8/2006 | Rodgers et al. |
| 2006/0183535 | A1 | 8/2006 | Marks et al. |
| 2006/0205473 | A1 | 9/2006 | Gomez et al. |
| 2006/0205474 | A1 | 9/2006 | Bansemer et al. |
| 2006/0246977 | A1 | 11/2006 | Cannon |
| 2006/0276243 | A1 | 12/2006 | Reinsdorff et al. |
| 2007/0015566 | A1 | 1/2007 | Baerlocher et al. |
| 2007/0021176 | A1 | 1/2007 | Jackson |
| 2007/0026923 | A1 | 2/2007 | Muir |
| 2007/0032285 | A1 | 2/2007 | Wolf |
| 2007/0060245 | A1 | 3/2007 | Veenker |
| 2007/0060247 | A1 | 3/2007 | Low et al. |
| 2007/0060255 | A1 | 3/2007 | Baerlocher et al. |
| 2007/0060271 | A1 | 3/2007 | Cregan et al. |
| 2007/0087809 | A1 | 4/2007 | Baerlocher |
| 2007/0111783 | A1 | 5/2007 | Cuddy et al. |
| 2007/0117606 | A1 | 5/2007 | Baerlocher et al. |
| 2007/0129128 | A1 | 6/2007 | McClintic |
| 2007/0129131 | A1 | 6/2007 | Kaminkow et al. |
| 2007/0129133 | A1 | 6/2007 | Bansemer et al. |
| 2007/0129134 | A1 | 6/2007 | Barrie |
| 2007/0142108 | A1 | 6/2007 | Linard et al. |
| 2007/0149267 | A1* | 6/2007 | Ross et al. ...................... 463/13 |
| 2007/0149269 | A1 | 6/2007 | Benbrahim |
| 2007/0191087 | A1 | 8/2007 | Thomas et al. |
| 2007/0207851 | A1 | 9/2007 | Yoshizawa |
| 2007/0265053 | A1 | 11/2007 | Linard et al. |
| 2008/0004105 | A1 | 1/2008 | Cregan et al. |
| 2008/0045321 | A1 | 2/2008 | Kato |
| 2008/0045323 | A1 | 2/2008 | Berman |
| 2008/0051188 | A1 | 2/2008 | Inamura |
| 2008/0064466 | A1 | 3/2008 | Saito |
| 2008/0070672 | A1 | 3/2008 | Inamura |
| 2008/0102926 | A1 | 5/2008 | Okada |
| 2008/0108408 | A1 | 5/2008 | Wolf |
| 2008/0119283 | A1 | 5/2008 | Baerlocher |
| 2008/0146321 | A1 | 6/2008 | Parente |
| 2008/0188287 | A1 | 8/2008 | Schlegel et al. |
| 2008/0194314 | A1 | 8/2008 | Yoshizawa |
| 2008/0200238 | A1 | 8/2008 | Mishra |
| 2008/0254893 | A1 | 10/2008 | Patel et al. |
| 2008/0311980 | A1 | 12/2008 | Cannon |
| 2009/0104959 | A1 | 4/2009 | Caputo et al. |
| 2009/0104969 | A1 | 4/2009 | Paulsen et al. |
| 2009/0124326 | A1 | 5/2009 | Caputo et al. |
| 2009/0166971 | A1 | 7/2009 | Mebane |
| 2009/0298571 | A1 | 12/2009 | Reynolds et al. |
| 2010/0062196 | A1 | 3/2010 | Bezek et al. |
| 2010/0234099 | A1 | 9/2010 | Rasmussen et al. |
| 2011/0006477 | A1 | 1/2011 | Miller et al. |
| 2011/0039614 | A1 | 2/2011 | Caputo et al. |
| 2011/0111825 | A1 | 5/2011 | Caputo |
| 2011/0136562 | A1 | 6/2011 | Loat et al. |
| 2011/0151961 | A1 | 6/2011 | Stevens et al. |
| 2011/0223985 | A1 | 9/2011 | Mizue |
| 2012/0122547 | A1 | 5/2012 | Aoki et al. |
| 2012/0302319 | A1 | 11/2012 | Linard et al. |
| 2013/0079100 | A1 | 3/2013 | Nicely |
| 2013/0122988 | A1 | 5/2013 | Guinn et al. |
| 2014/0221074 | A1* | 8/2014 | Gugler ............................ 463/20 |

FOREIGN PATENT DOCUMENTS

| | | |
|---|---|---|
| AU | 711501 | 10/1999 |
| CA | 2288723 | 10/1998 |
| EP | 0058488 | 8/1982 |
| EP | 219305 | 4/1987 |
| EP | 0238289 | 9/1987 |
| EP | 0410789 | 7/1990 |
| EP | 0698869 | 2/1996 |
| EP | 0798676 | 10/1997 |
| EP | 0874337 | 10/1998 |
| EP | 0945837 | 9/1999 |
| EP | 0984408 | 3/2000 |
| EP | 1063622 | 12/2000 |
| EP | 1083531 | 3/2001 |
| EP | 1205894 | 10/2001 |
| EP | 1205897 | 5/2002 |
| EP | 1298601 | 4/2003 |
| EP | 1336941 | 8/2003 |
| EP | 1617386 | 1/2006 |
| EP | 1635306 | 3/2006 |
| EP | 1653416 | 5/2006 |
| GB | 1454046 | 10/1976 |
| GB | 2062922 | 5/1981 |
| GB | 2089086 | 6/1982 |
| GB | 2090690 | 7/1982 |
| GB | 2096376 | 10/1982 |
| GB | 2097160 | 10/1982 |
| GB | 2100905 | 1/1983 |
| GB | 2105891 | 3/1983 |
| GB | 2106293 | 4/1983 |
| GB | 2106295 | 4/1983 |
| GB | 2106682 | 4/1983 |
| GB | 2117155 | 10/1983 |
| GB | 2130413 | 5/1984 |
| GB | 2137392 | 10/1984 |
| GB | 2144644 | 3/1985 |
| GB | 2147442 | 5/1985 |
| GB | 2147773 | 5/1985 |
| GB | 2161008 | 1/1986 |
| GB | 2170636 | 2/1986 |
| GB | 2165385 | 4/1986 |
| GB | 2183882 | 6/1986 |

(56) References Cited

FOREIGN PATENT DOCUMENTS

| | | |
|---|---|---|
| GB | 2170643 | 8/1986 |
| GB | 2181589 | 4/1987 |
| GB | 2183882 | 6/1987 |
| GB | 2190227 | 11/1987 |
| GB | 2191030 | 12/1987 |
| GB | 2213624 | 8/1989 |
| GB | 2222712 | 3/1990 |
| GB | 2225889 | 6/1990 |
| GB | 2226436 | 6/1990 |
| GB | 2226907 | 7/1990 |
| GB | 2242300 | 9/1991 |
| GB | 2243236 | 10/1991 |
| GB | 2262642 | 6/1993 |
| GB | 2316214 | 2/1998 |
| GB | 2201821 | 9/1998 |
| GB | 2328311 | 2/1999 |
| GB | 2333880 | 8/1999 |
| GB | 2341262 | 3/2000 |
| GB | 2353128 | 2/2001 |
| GB | 2372132 | 8/2002 |
| GB | 2393019 | 3/2004 |
| GB | 2402256 | 12/2004 |
| GB | 2422121 | 7/2006 |
| JP | 2007307305 | 11/2007 |
| WO | WO 85/00910 | 2/1985 |
| WO | WO 96/08799 | 3/1996 |
| WO | WO 96/35491 | 11/1996 |
| WO | WO 97/32285 | 9/1997 |
| WO | WO 98/20949 | 5/1998 |
| WO | WO 99/64997 | 12/1999 |
| WO | WO 00/12186 | 3/2000 |
| WO | WO 00/30727 | 6/2000 |
| WO | WO 00/32286 | 6/2000 |
| WO | WO 00/66235 | 11/2000 |
| WO | WO 00/76606 | 12/2000 |
| WO | WO 01/15055 | 3/2001 |
| WO | WO 01/19476 | 3/2001 |
| WO | WO 01/26019 | 4/2001 |
| WO | WO 01/41892 | 6/2001 |
| WO | WO 01/74464 | 10/2001 |
| WO | WO 01/87441 | 11/2001 |
| WO | WO 01/93967 | 12/2001 |
| WO | WO 02/077935 | 10/2002 |
| WO | WO 02/102484 | 12/2002 |
| WO | WO 03/049055 | 3/2003 |
| WO | WO 03/026758 | 4/2003 |
| WO | WO 03/089084 | 10/2003 |
| WO | WO 03/089088 | 10/2003 |
| WO | WO 2004/025584 | 3/2004 |
| WO | WO 2004/082779 | 9/2004 |
| WO | WO 2005/009560 | 3/2005 |
| WO | WO 2005/027058 | 3/2005 |
| WO | WO 2005/027061 | 3/2005 |
| WO | WO 2005/035080 | 4/2005 |
| WO | WO 2005/057339 | 6/2005 |
| WO | WO 2005/075037 | 8/2005 |
| WO | WO 2005/086018 | 9/2005 |
| WO | WO 2005/105241 | 11/2005 |
| WO | WO 2006/009248 | 1/2006 |
| WO | WO 2007/021724 | 2/2007 |

* cited by examiner

GAMING SYSTEM AND METHOD FOR PROVIDING A STREAMING SYMBOLS GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide cascading symbol or tumbling reel games are also known. In one such cascading symbol or tumbling reel game, a gaming machine generates and displays a plurality of symbols on a plurality of reels in a symbol display matrix or grid. This symbol display matrix includes a plurality of symbol display positions. Each symbol display position is associated with a specific row and a specific column of the symbol display matrix. In such a cascading symbol game, the gaming machine evaluates the displayed symbols and provides an award for each winning symbol combination formed. The gaming machine then removes and discards the displayed symbols that form the winning combination(s) of symbols to create one or more empty symbol display positions. The gaming machine shifts zero, one, or more of the remaining displayed symbols downward into zero, one, or more of the created empty symbol display positions of the reels. If any empty symbol display positions remain, the gaming machine generates and displays a symbol for each remaining empty symbol display position. The gaming machine then reevaluates the displayed symbols and provides an award for any winning symbol combinations formed. If winning symbol combinations continue to be formed, the gaming machine repeats the steps of removing generated symbols of the winning symbol combinations, shifting generated symbols, generating new symbols, and evaluating generated symbols.

There is a continuing need to increase the level of excitement and entertainment for people playing gaming machines. There is also need for new ways of providing better gaming experiences and environments at gaming machines.

SUMMARY

In various embodiments, present disclosure relates generally to gaming systems and methods for providing a streaming symbols game including a single continuous series or chain of symbols and a plurality of symbol display positions which form a path. The path includes: (i) a starting or entering symbol display position; (ii) a plurality of adjacent symbol display positions (wherein each symbol display position is adjacent to at least two other symbol display positions); and (iii) an ending or exit symbol display position. In one such embodiment, the plurality of symbol display positions of the path form a grid or matrix including a plurality of rows and a plurality of columns. In another such embodiment, the plurality of symbol display positions of the path form a non-grid or non-matrix arrangement. Such a gaming system increases certain player's level of excitement and enjoyment by providing increased versatility of how the symbols are displayed to the player. That is, unlike typical tumbling reel games which involve a plurality of reels displayed in a matrix or grid configuration, in different embodiments, the gaming system disclosed herein displays the path of symbol display positions in various non-matrix and non-grid configurations and thus increases the level of excitement for certain player's.

In operation of various embodiments, upon an initiation of the streaming symbols game, such as upon a placement of a wager, the gaming system displays the path of symbol display positions. In one such embodiment, the gaming system displays a randomly determined path of symbol display positions for different games played. In another such embodiment, the gaming system displays a static or predefined path of symbol display positions.

After displaying the path of symbol display positions, the gaming system populates the path of symbol display positions with the chain of symbols. In one embodiment, this population occurs by the gaming system displaying one or more of the symbols of the chain of symbols entering the path at the starting symbol display position, moving in one direction through each of the adjacent symbol display positions and exiting at the ending symbol display position. In one such embodiment, the quantity of symbols of the chain is greater than the quantity of symbol display positions of the path such that after at least one symbol of the chain has moved past the exit symbol display position, each of the symbol display positions of the path still display at least one of the symbols of the chain of symbols. In another such embodiment, in addition or as an alternative to the quantity of symbols of the chain being greater than the quantity of symbol display positions of the path, the gaming system causes the first symbol of the chain of symbols to re-enter the path (via the starting symbol display position) after exiting the path at the ending symbol display position such that at any designated point in time, each of the symbol display positions of the path display at least one of the symbols of the chain of symbols.

After populating the path with the chain of symbols such that the gaming system displays at least one of the symbols of the chain at each of the symbol display positions, the gaming system stops the movement of the chain of symbols. In one embodiment, the gaming system stops the symbols moving to correspond with a randomly generated game outcome. In another embodiment, the gaming system stops the symbols moving in association with one or more inputs from the player, such as a stop symbol movement input from the player. It should be appreciated that this embodiment employs one or more aspects of player skill in determining when to stop the chain of symbol's movement and thus this embodiment employs one or more aspects of player skill in determining the outcome (and any associated award) of the streaming symbols game disclosed herein.

After stopping the movement of the chain of symbols through the path of symbol display positions, the gaming system evaluates the symbols of the chain displayed at the symbol display positions of the path and provides any awards for any winning symbol combinations.

If the symbols of the chain displayed at the symbol display positions of the path do not form any winning symbol combinations, the gaming system terminates or concludes the play of the streaming symbols game. On the other hand, if the symbols of the chain displayed at the symbol display positions of the path form at least one winning symbol combination, the gaming system removes one or more of the symbols of the chain which are part of any winning symbol combinations.

Following the removal of one or more of the symbols of the chain which are part of any winning symbol combinations, the gaming system shifts zero, one or more of the displayed remaining symbols (i.e., the displayed non-removed symbols) of the chain to fill each of the empty symbol display positions of the path. That is, one or more the symbols of the chain that remain in the symbol display positions of the path move in the direction of movement to fill the empty symbol display positions. Such movement of these remaining symbols creates different empty symbol display position such that the gaming system moves (again in the direction of movement), one or more symbols of the chain that were not previously displayed in any symbol display positions to fill the newly created empty symbol display positions. Accordingly, after the shifting or moving of the chain of symbols to account for the removal of one or more symbols from the chain, each of the symbol display positions of the path again displays at least one symbol of the chain.

After shifting the chain of symbols to repopulate the symbol display positions of the path, the gaming system evaluates the symbols of the chain displayed at the symbol display positions of the path and proceeds as described above until the gaming system determines that the symbols of the chain displayed at the symbol display positions of the path do not form any winning symbol combinations.

Such a configuration provides players with the opportunity to win multiple awards for a single play of the game. This configuration thus increases the level of excitement and enjoyment for players because as the play of the game progresses, additional award opportunities become available for the player.

Such a configuration also provides an increased level of excitement and enjoyment for certain players as these players view the single, continuous chain of symbols moving through the path of symbol display positions. That is, such players enjoy the increased anticipation associated with watching the chain of symbols move not knowing when the chain of symbols will stop and thus not knowing if the chain of symbols will stop moving with a relatively lucrative portion of the chain of symbols displayed along the symbol display positions of the path or a relatively non-lucrative portion of the chain of symbol displayed along the symbol display positions of the path.

Such a configuration further provides an increased level of excitement and enjoyment for certain players compared to certain games which include a plurality of reels arranged in a matrix. That is, utilizing non-matrix paths of symbol display positions provides the same or similar anticipation, randomness, and volatility of certain reel-matrix configuration games but also creates additional opportunities for how to present such symbol display positions to these players.

Additional features and advantages are described in, and will be apparent from, the following Detailed Description and the figures.

BRIEF DESCRIPTION OF THE FIGURES

FIGS. 3A, 3B, 30, 3D, 3E, 3F and 3G are front views of one embodiment of the gaming system disclosed herein illustrating a play of a streaming symbols game.

DETAILED DESCRIPTION

Streaming Symbols

In various embodiments, the gaming system disclosed herein provides streaming symbols game which utilizes a single continuous series or chain of symbols and a plurality of symbol display positions which form a path. Specifically, in various embodiments, the gaming system displays the chain of symbols continuously moving through the path of symbol display positions wherein which symbols are evaluated for any awards corresponds to when the chain of symbols stops moving along the path.

While the embodiments described below are directed to a primary wagering game, it should be appreciated that the present disclosure may additionally or alternatively be employed in association with a secondary or bonus game. Moreover, while the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

Figure 1:
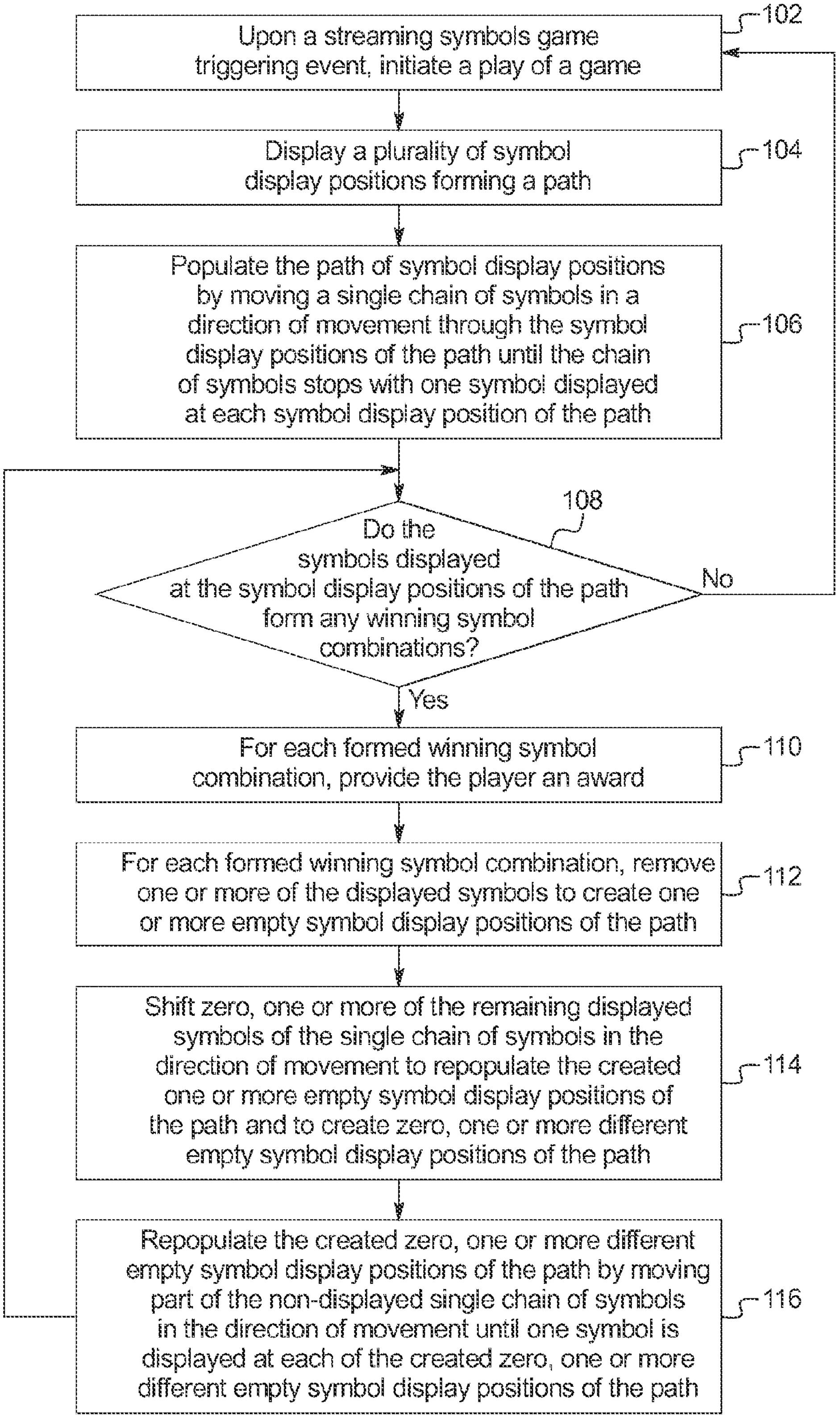
FIG. 1 is a flow chart an example process for operating a gaming system providing one embodiment of the streaming symbols game disclosed herein.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, upon an occurrence of a streaming symbols game triggering event, as indicated in block 102 of FIG. 1, the gaming system triggers a play of a streaming symbols game. In one embodiment, the streaming symbols game is a primary game wherein a streaming symbols game triggering event occurs upon a player placing a wager to play the streaming symbols game. In another embodiment, the streaming symbols game is a secondary or bonus game wherein a streaming symbols game triggering event occurs based on a displayed event associated with a wagered on play of a primary game. In another embodiment wherein the streaming symbols game is a secondary or bonus game, a streaming symbols game triggering event occurs based on an event independent of any displayed event associated with a wagered on play of a primary game.

In one embodiment, for the triggered streaming symbols game, the gaming system displays a plurality of symbol display positions forming a path as indicated in block 104. The formed path of symbol display positions includes a starting or entering symbol display position, a plurality of adjacent symbol display positions (wherein each symbol display position is adjacent to at least two other symbol display positions) and an ending or exit symbol display position. In different embodiments, the path of symbol display positions extends in one or more directions to form one or more shapes or patterns.

In one embodiment, the gaming system displays the same path of symbol display positions for a plurality of plays (or each play) of the triggered streaming symbols game. In one such embodiment wherein the gaming system utilizes the same path of symbol display positions for each triggered streaming symbols game, the gaming system utilizes different starting symbol display positions and/or different ending symbol display positions for different plays of the game. In another embodiment, the gaming system randomly selects a path of symbol display positions from a plurality of predefined paths of symbol display positions. In one such embodiment, the predefined paths each have an equal (or substantially equal) probability of being randomly selected. In another such embodiments, different predefined paths have different probabilities of being randomly selected. In another embodiment, for one or more triggered games, the gaming system randomly forms the symbol display position path. In one such embodiment, in addition to randomly forming the path of symbol display positions, the gaming system also randomly determines which symbol display positions of the formed path to utilize as a starting symbol display position and/or an ending symbol display position.

Following the gaming system displaying the formed path of symbol display positions, as indicated by block 106 of FIG. 1, the gaming system populates the path of symbol display positions by moving a single chain of symbols in a direction of movement through the symbol display positions of the path until the chain of symbols stops with one symbol displayed at each symbol display position of the path. That is, the gaming system displays one or more of the symbols of the chain of symbols entering the path at the starting symbol display position, moving in one direction through each of the adjacent symbol display positions and ending at (or alternatively exiting at) the ending symbol display position. In other words, the gaming system displays a first symbol of the chain of symbols (and a plurality of symbols in the chain which follow the first symbol) moving, proceeding or streaming in a designated direction through a plurality of symbol display positions of the path. It should be appreciated that the gaming system displays the path of symbol display positions akin to a single multi-directional reel wherein the chain of symbols is displayed akin to a single reel strip associated with the single multi-directional reel.

In certain embodiments, the gaming system stops the symbol movement relative to one or more predefined symbol stopping rules. In one such embodiment, the predefined symbol stopping rule maximizes the award size. In another such embodiment, the predefined symbol stopping rule maximizes the winning symbol combination hit frequency. In another such embodiments, the predefined symbol stopping rule maximizes the long-term average expected payback percentage. In another such embodiments, the predefined symbol stopping rule accomplishes the objective of executing the rule itself. In certain embodiments, the gaming system enables the player to select the set of the predefined symbol stopping rules the gaming system is to follow. In certain embodiments, the gaming system enables the player to select between (i) the gaming system acting upon one or more player inputs, and (ii) the gaming system stopping the symbols based upon one or more predefined symbol stopping rules. In certain embodiments, the gaming system has a predefined amount of time in which to apply automatic predefined symbol stopping rule, wherein if a condition required by the predefined symbol stopping rules to stop within that time period does not occur, an alternate stopping procedure is used, such as stopping immediately upon expiration of an amount of time.

In one embodiment, the gaming system utilizes a predefined chain of symbols wherein each symbol of the chain has a static relationship to each of the other symbols of the chain. In another embodiment, the gaming system randomly determines part or all of the chain of symbols for the play of the streaming symbols game. In one such embodiment, the gaming system randomly generates each symbol prior to displaying that symbol at the starting symbol display position. In another such embodiment, the gaming system randomly generates a plurality of symbols (i.e., a portion of the chain of symbols) prior to displaying any of such symbols at the starting symbol display position.

In one embodiment, the quantity of symbols of the chain is greater than the quantity of symbol display positions of the path such that after at least one symbol of the chain has moved past the exit symbol display position, the gaming system still displays, for at least one additional symbol of the chain, at least one of the symbols of the chain of symbols at each of the symbol display positions of the path. For example, the path of symbol display positions includes twenty-five symbol display positions and the chain of symbols includes hundreds (and even thousands) of symbols such that even after the first symbol of the chain (or even the first hundred symbols of the chain) has exited the path of symbol display positions, a plurality of symbols of the chain will follow such that for a designated period of time prior to stopping of the movement of the chain of symbols, the gaming system will display at least one symbol at each symbol display position of the path. In another such embodiment, in addition or as an alternative to the quantity of symbols of the chain being greater than the quantity of symbol display positions of the path, the gaming system causes the first symbol of the chain of symbols to re-enter the path (via the starting symbol display position) after exiting the path at the ending symbol display position such that at any designated point in time prior to the stopping of the movement of the chain of symbols, each of the symbol display positions of the path display at least one of the symbols of the chain of symbols.

After populating the path with the chain of symbols such that the gaming system displays at least one of the symbols of the stopped chain at each of the symbol display positions, the gaming system determines whether the symbols displayed at the symbol display positions of the path form any winning symbol combinations as indicated in diamond 108 of FIG. 1.

In one embodiment, one or more paylines of any suitable direction extend through a plurality of symbol display positions, wherein the gaming system determines whether any symbols displayed along such paylines form any winning symbol combinations. In another embodiment, one or more ways to win are associated with a plurality of symbol display positions, wherein the gaming system determines, as further described below, whether any symbols displayed at active symbol display positions form any strings of related symbols. In another embodiment, the gaming system evaluates the symbols of the chain displayed at the symbol display positions in accordance with one or more scatter pay determinations. In another embodiment, the gaming system determines whether any set of similar symbols displayed at adjacent symbol display positions form a winning symbol combination. It should be appreciated that the order or pairings of which symbols are evaluated is based, at least in part, on the configuration of the path of symbol display positions. For example, if the path of symbol display positions forms a matrix configuration, then one or more paylines may extend through one or more non-adjacent symbol display positions. In another example, if the path of symbol display positions forms a non-matrix configuration, then one or more paylines may extend only through adjacent symbol display positions.

If the symbols displayed at the symbol display positions of the path form one or more winning symbol combinations as indicated in block 110, the gaming system provides an award for each formed winning symbol combination. The gaming system then removes one or more of the displayed symbols included in one or more of the formed winning symbol combinations to create one or more empty symbol display positions of the path as indicated in block 112.

Following the removal of one or more of the displayed symbols included in one or more of the formed winning symbol combinations, the gaming system repopulates zero, one or more of the created empty symbol display positions by shifting or moving (according to applicable game rules) one or more of the remaining displayed symbols of the single chain of symbols into one or more of any empty symbol display positions as indicated in block 114. It should be appreciated that such shifting of the displayed symbols causes a cascading, tumbling, or falling appearance of the symbols in the gaming system, which increases player excitement and enjoyment.

For example, under one set of applicable game rules wherein symbols are shifted in the direction of movement which they originally populated the path of symbol display positions to fill empty symbol display positions, if a winning symbol combination results in an empty adjacent symbol display position of the path, the gaming system will shift at least one displayed symbol upstream from the empty adjacent symbol display position to fill the empty symbol display position. That is, to fill the empty symbol display position of this example, the gaming system will shift or move one or more symbols (which are closer to the starting symbol display position than the empty symbol display position) to fill the empty symbol display position. It should be appreciated that in this example, under these applicable set of game rules, if a winning symbol combination results in a displayed empty symbol display position adjacent to the starting symbol display position, the gaming system will not shift or move any displayed symbols to fill the empty symbol display position.

In various embodiments, rather than shifting the remaining displayed symbols in the same direction of movement which the symbols populated the symbol display positions of the path, the gaming system shifts the remaining displayed symbols in one of more different directions to fill one or more empty symbol display positions. In certain embodiments, the gaming system reveals a secondary symbol in association with the removal of a symbol. This secondary symbol indicates information regarding the replacement of the symbol, such as the secondary symbol indicates that the gaming system will replace the symbol by advancing the back half of the symbol string one space, the secondary symbol indicates that the gaming system will replace the symbol by reversing the front half of the symbol string, or if the symbols are arranged in a matrix, the gaming system indicates from which direction in the matrix the symbol would be pulled from.

In one embodiment, the gaming system shifts any remaining displayed symbols of the chain as many symbol display positions as possible in a designated direction, while maintaining the position of each shifted symbol relative to one or more other symbols or coordinates. In this embodiment, shifting the non-removed symbols does not result in fewer empty symbol display positions. Rather, shifting the non-removed symbols results in a plurality of different empty symbol display positions wherein each empty symbol display position has a given relationship to any remaining symbols, the relationship based on the direction of shifting.

After shifting zero, one or more symbols, as indicated in block 116, the gaming system repopulates the created zero, one or more different empty symbol display positions of the path by moving part of the non-displayed single chain of symbols in the direction of movement until one symbol is displayed at each of the created zero, one or more different empty symbol display position of the path. That is, similar to how the single chain of symbols moved through the path to populate the symbol display positions of the path upon the initiation of the game, the gaming system causes one or more previously undisplayed symbols from the chain of symbols (i.e. one or more symbols from the chain of symbols which have not yet moved to the starting symbol display position) to move and fill in the newly created empty symbol display positions.

Following the display of a symbol from the chain of symbols in each of the created empty symbol display positions, the gaming system then returns to diamond 108 and proceeds with determining whether the generated symbols (i.e., the non-removed symbols from a previous generation and display of at least one symbol and the newly displayed symbols) form any winning symbol combinations.

If no winning symbol combinations are formed from the displayed symbols (i.e., either from the initial population of the path of symbol display positions with the chain of symbols or from a combination of the non-removed symbols from a previous population of the symbol display positions and a repopulation of at least one empty symbol display position), the gaming system the gaming system ends the play of the game and returns to block 102 to await another streaming symbols game triggering event to initiate another play of the game.

Figure 2A:
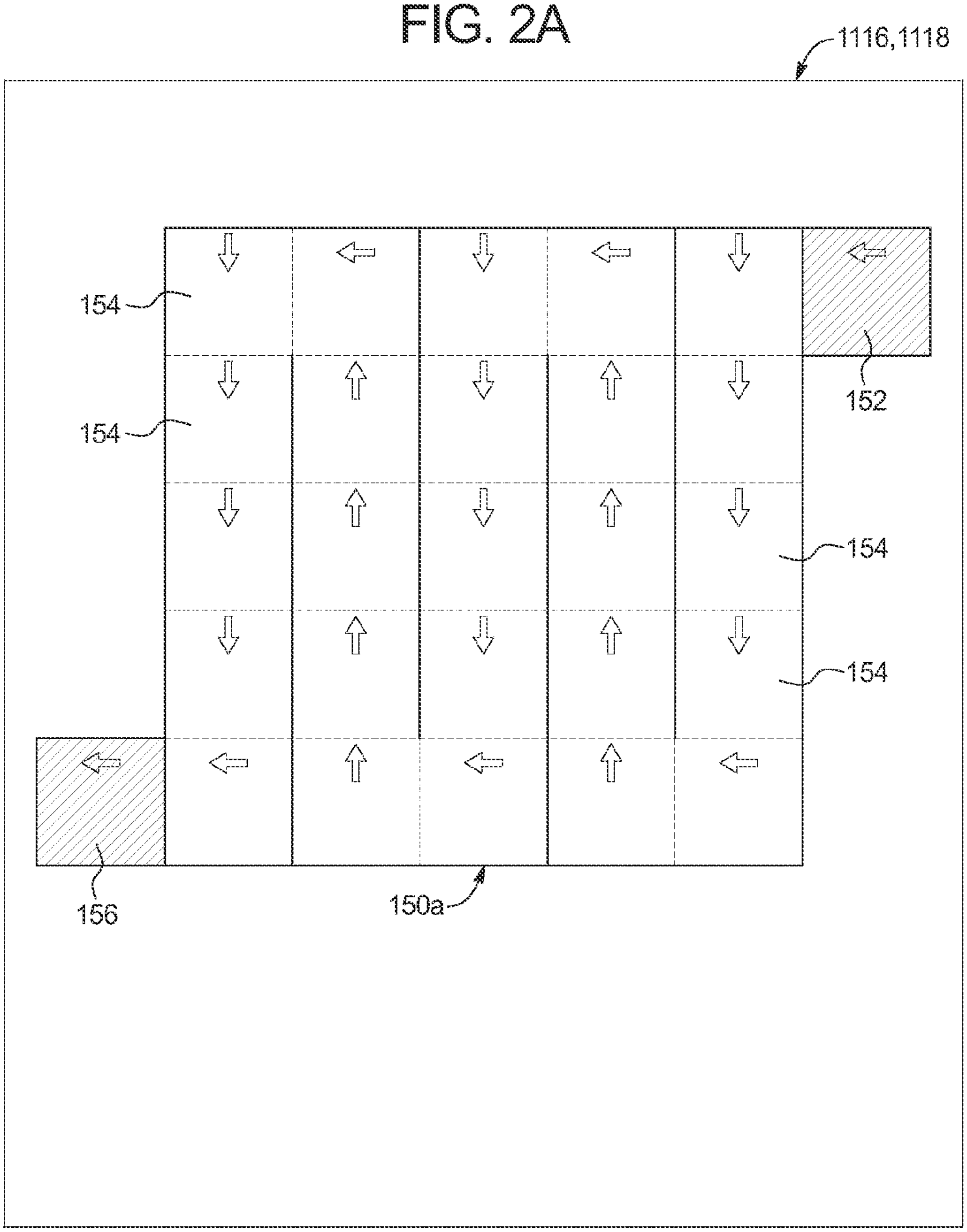
FIGS. 2A, 2B, 2C and 2D are front views of different embodiments of the gaming system disclosed herein illustrating different configurations of the path of symbol display positions.
Figure 2B:
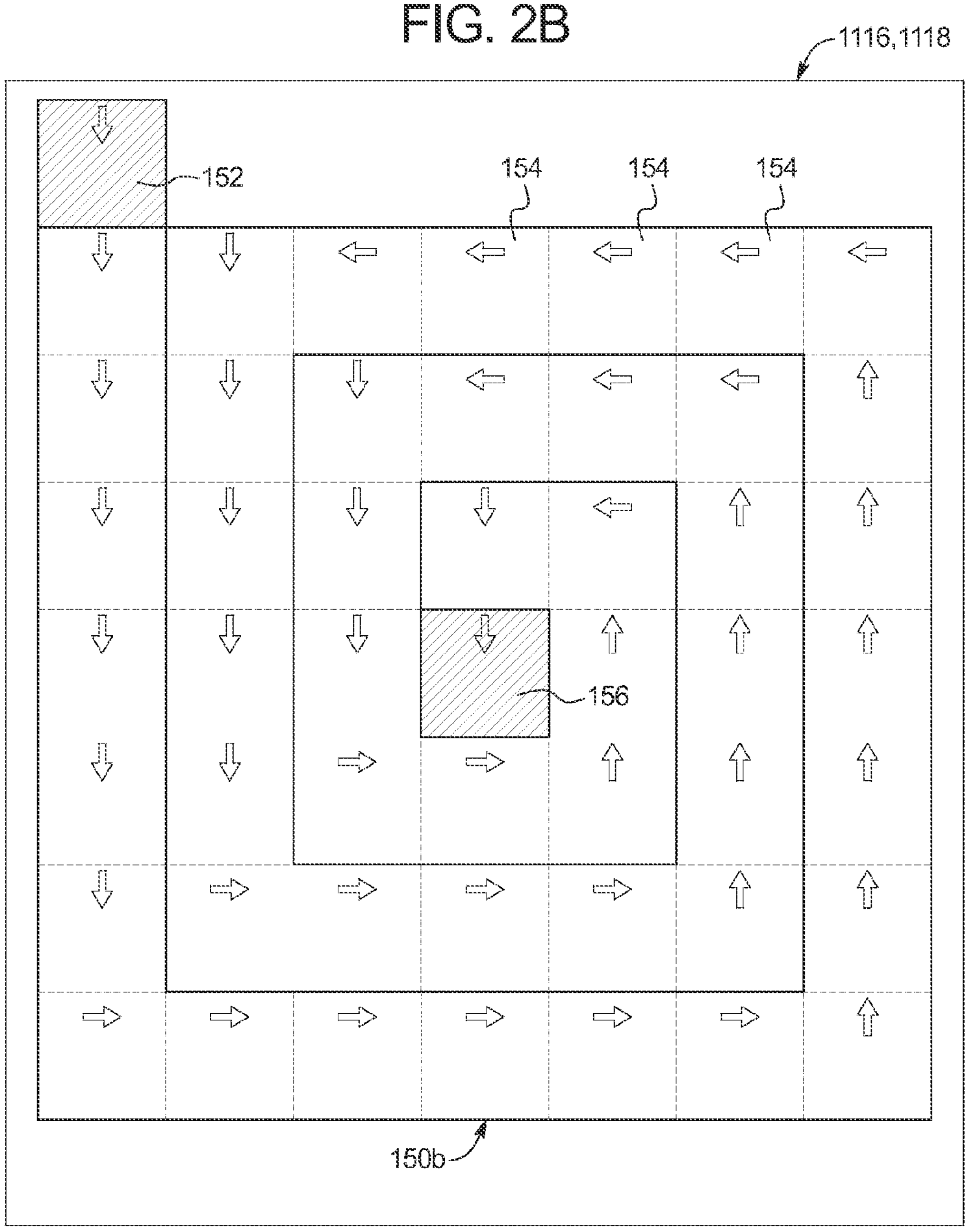
Figure 2C:
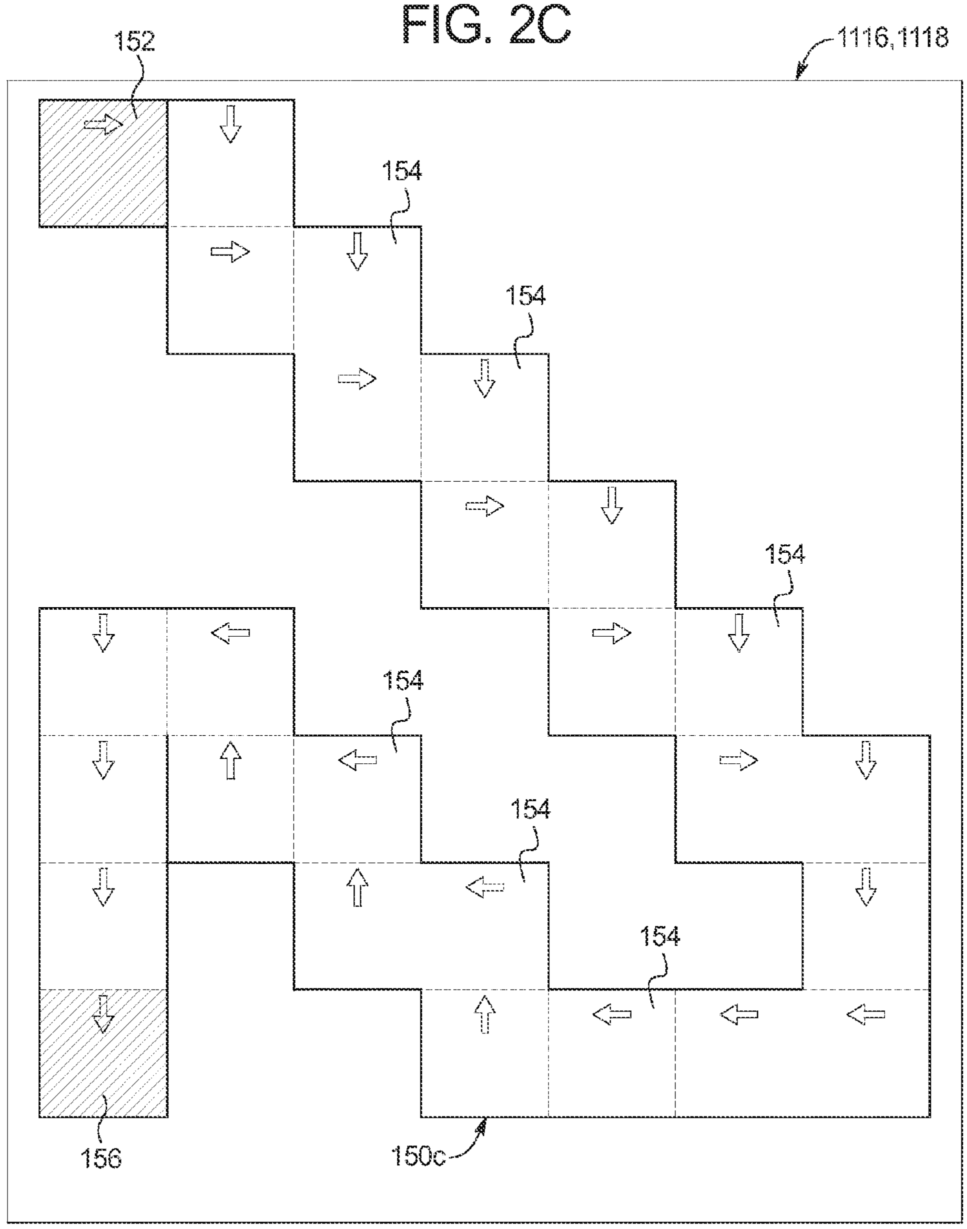
Figure 2D:
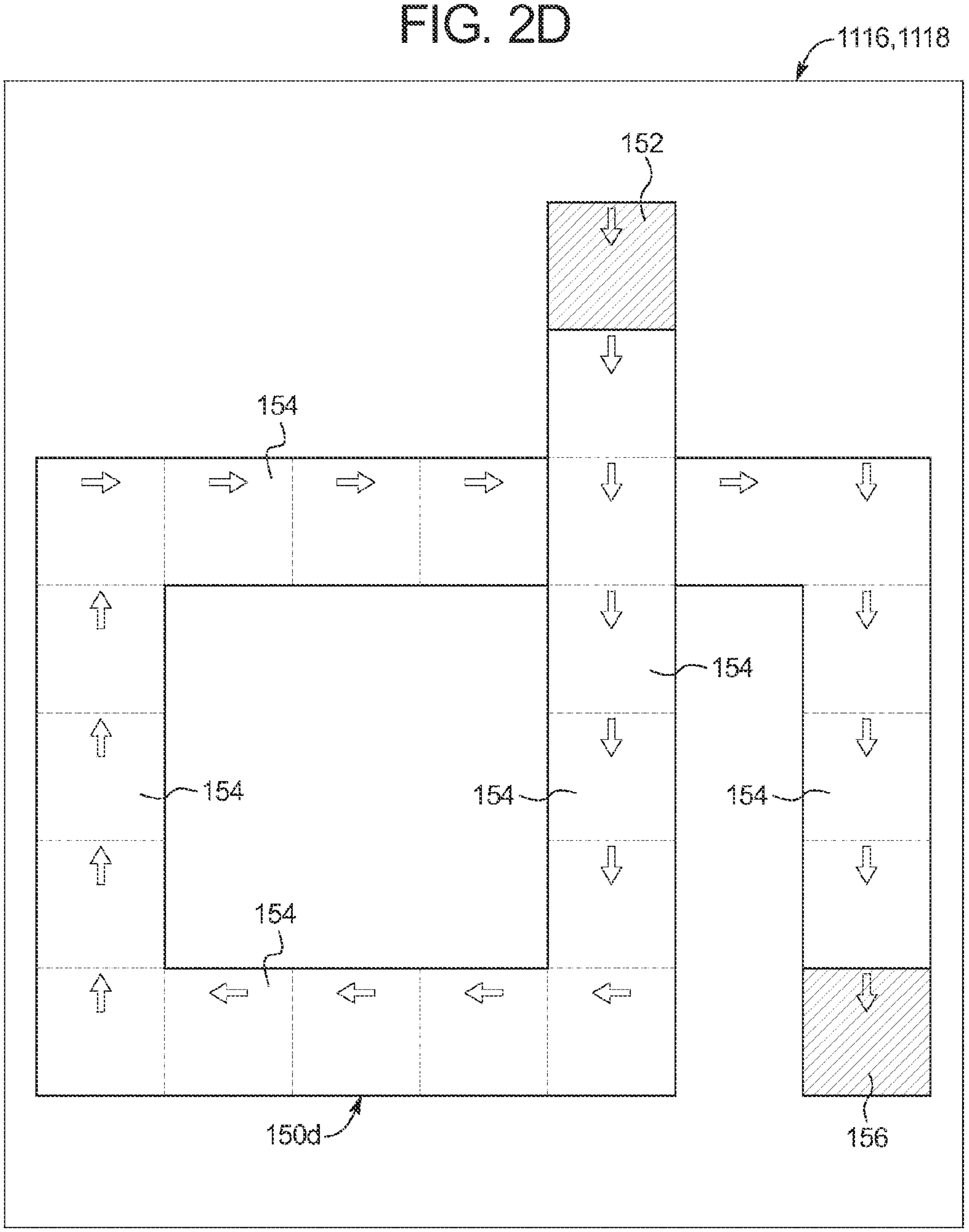

In one embodiment, as described above, the gaming system initially forms and displays a path of symbol display positions and then streams the chain of symbols through the formed path in a designated direction of movement (indicated as arrows in FIGS. 2A to 2D). In one example embodiment, as seen in FIGS. 2A and 2B, the gaming system displays the plurality of symbol display positions forming a path 150*a* and 150*b* with a plurality of directional changes to result in a matrix or grid configuration. In another embodiment, as seen in FIGS. 2C and 2D, the gaming system displays the plurality of symbol display positions forming a path 150*c* and 150*d* with a plurality of directional changes to result in a non-matrix or non-grid configuration. It should be appreciated that in each of these example path configurations, each path includes a starting symbol display position 152, a plurality of adjacent symbol display positions 154 and an ending symbol display position 156.

In one example embodiment, as seen in FIG. 2A, while the gaming system displays the starting symbol display position and the ending symbol display position, any symbols displayed at such starting symbol display position and such ending symbol display position are not part of the path and thus, as described below, not evaluated in any award determinations. Rather, in this example embodiment, any symbol displayed at the starting symbol display position informs the player which symbol of the chain will be entering the path next. Additionally, in this example embodiment, any symbol displayed at the ending symbol display position informs the player which symbol of the chain recently exited the path.

In another example embodiment, as seen in FIG. 2B, while the gaming system displays the starting symbol display position and the ending symbol display position, any symbols displayed at the starting symbol display position are not part of the path and thus, as described below, not evaluated in any award determinations. Rather, in this example embodiment, the gaming system displays a symbol at the starting symbol display position to inform the player which symbols of the chain will be entering the path next. It should be appreciated that in this embodiment, the gaming system evaluates the symbol displayed at the ending symbol display position in at least one award determination.

In another example embodiment, as seen in FIGS. 20 and 20, any symbols displayed at the starting symbol display position and at the ending symbol display position are part of the path and evaluated in any award determinations.

As further seen in FIG. 2D, in one embodiment, the gaming system forms the path of symbol display positions such that one or more portions of the path overlap one or more other portions of the path. Such overlapping causes one symbol display position to block or mask another symbol display position. In this embodiment, the symbols of the chain pass through both symbol display positions as such symbols move along the path. For example, based on the direction of movement and the location of the starting symbol display position, a symbol moving through the path of FIG. 2D would first move to the top overlapping symbol display position and then subsequently move to the bottom overlapping symbol display position (not shown).

Figure 3A:
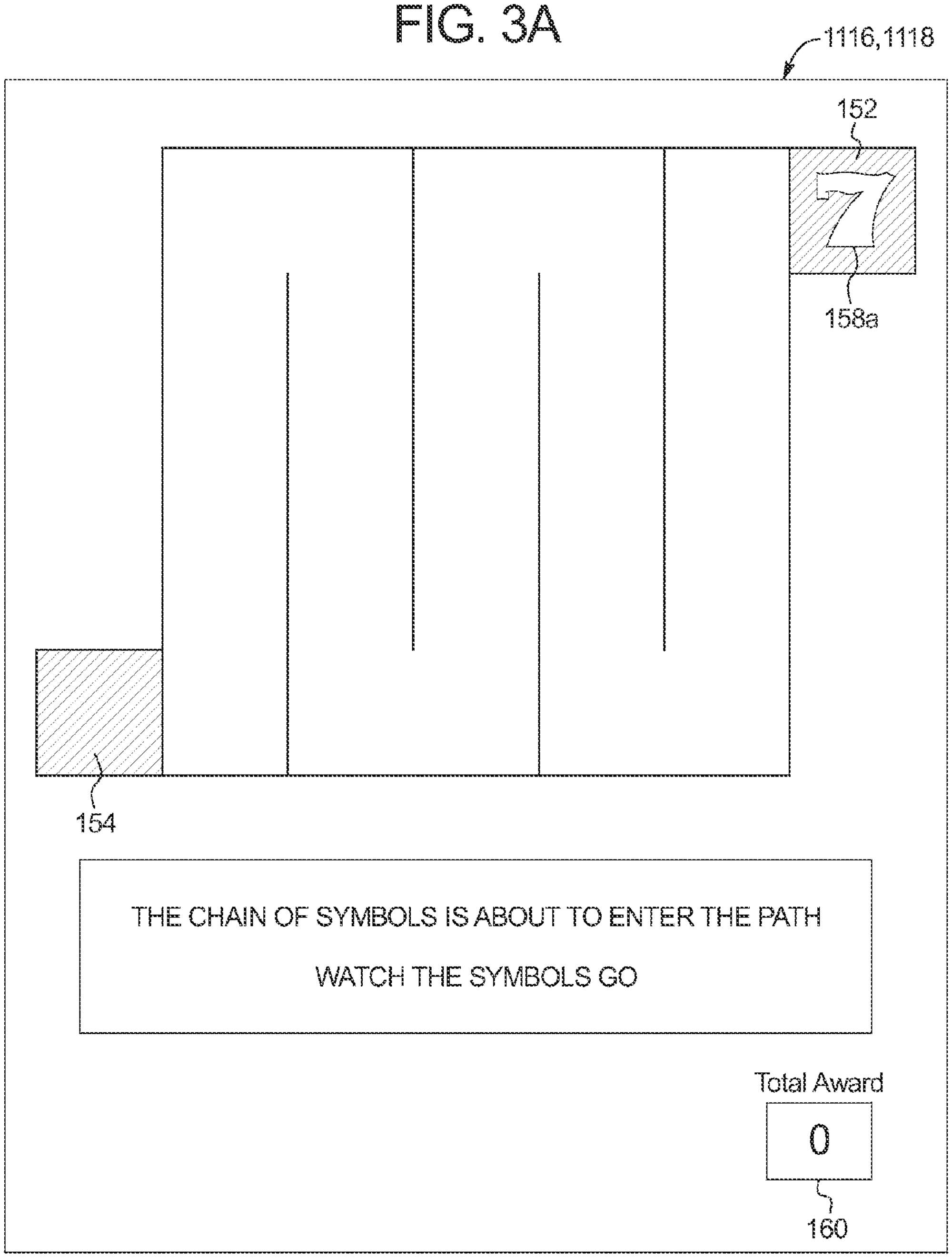

Turning to an example play of one embodiment of the streaming symbols game, as seen in FIG. 3A, at a first point in time, the gaming system displays a seven symbol 158*a* (i.e., the first symbol of the chain) displayed at the starting symbol display position 152 and thus about to enter the path of symbol display positions. In this example, the gaming system provides appropriate messages such as "THE CHAIN OF SYMBOLS IS ABOUT TO ENTER THE PATH" and "WATCH THE SYMBOLS GO" to the player visually, or through suitable audio or audiovisual displays.

Figure 3B:
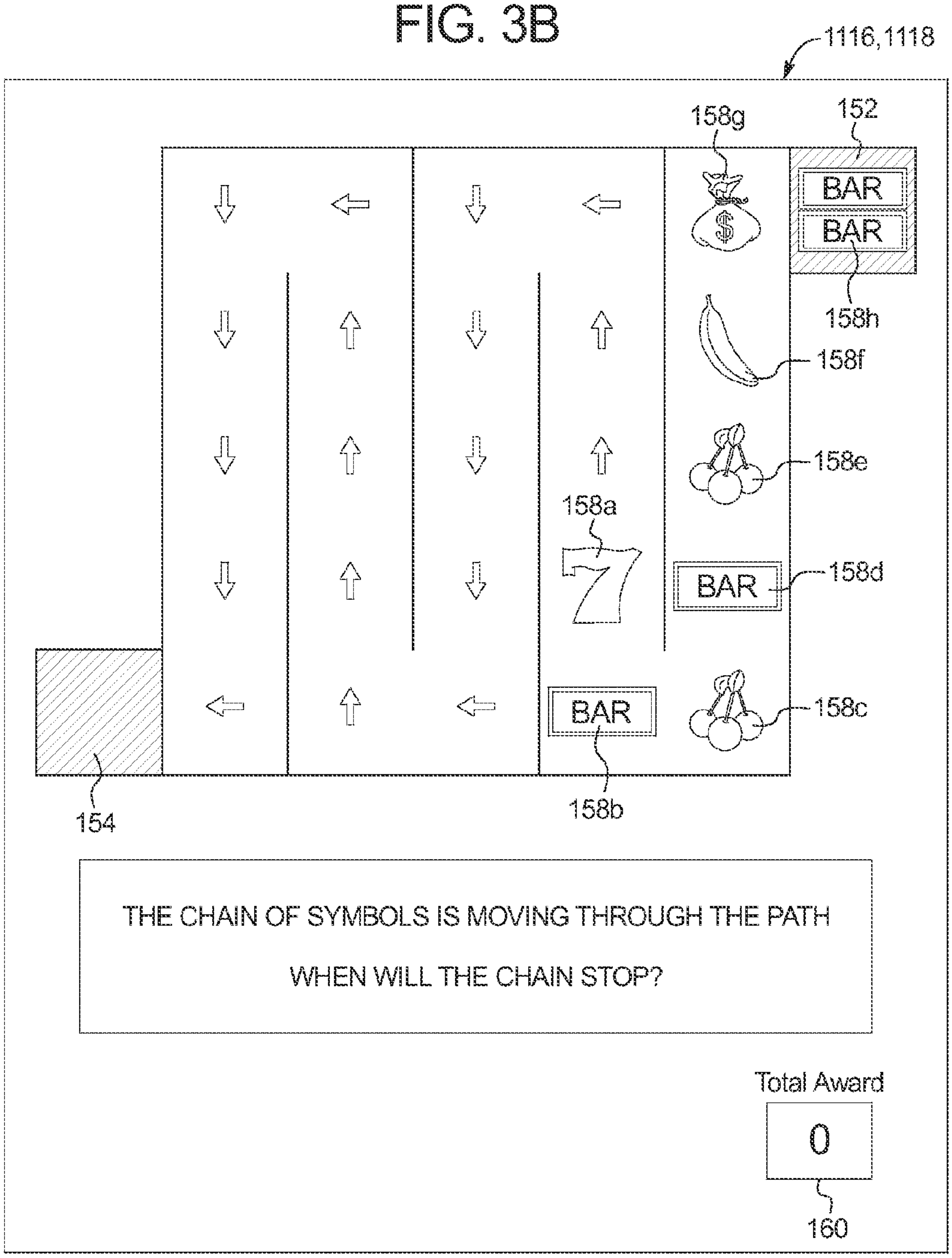

As seen in FIG. 3B, at a second, subsequent point in time, the gaming system displays the seven symbol 158*a* proceeding in the designated direction (indicated as arrows) along the path of symbol display positions toward the ending symbol display position 154. As also seen in FIG. 3B, following the seven symbol 158*a*, a plurality of symbols of the chain of symbol (158*b* to 158*g*) also enter the path (via the starting symbol display position) and also proceed in the designated direction along the path of symbol display positions toward the ending symbol display position 154. In this example, the gaming system provides appropriate messages such as "THE CHAIN OF SYMBOLS IS MOVING THROUGH THE PATH" and "WHEN WILL THE CHAIN STOP?" to the player visually, or through suitable audio or audiovisual displays.

Figure 3C:
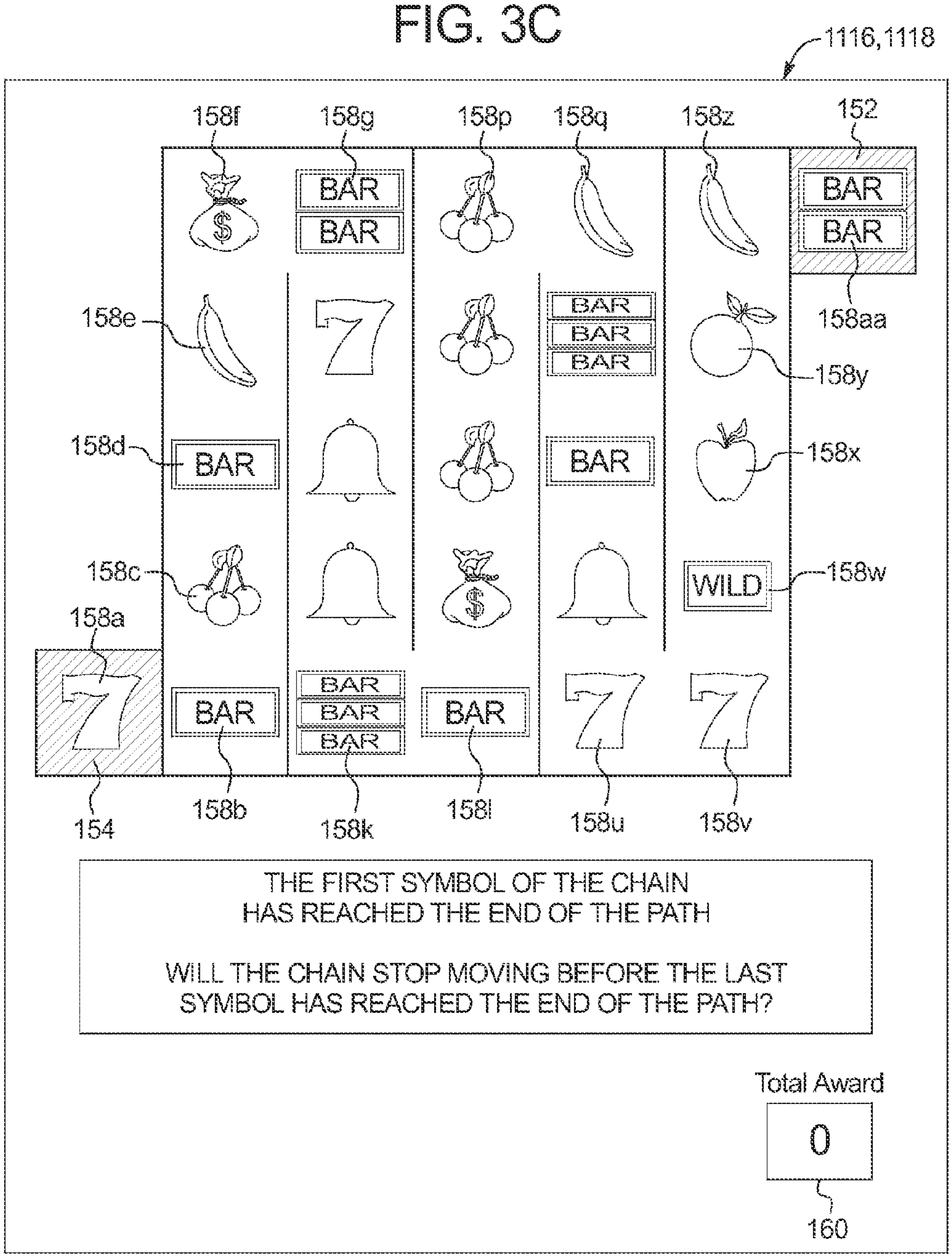

As seen in FIG. 3C, at a third, subsequent point in time, the first symbol of the chain of symbols (i.e., seven symbol 158*a*) has moved through each of the symbol display positions of the path and is currently displayed off the path of symbol display positions at the ending symbol display position 154. At this third point in time of this illustrated example, each of the symbol display positions of the path currently display one of the symbols of the chain. In this example, the gaming system provides appropriate messages such as "THE FIRST SYMBOL OF THE CHAIN HAS REACHED THE END OF THE PATH" and "WILL THE CHAIN STOP MOVING BEFORE THE LAST SYMBOL HAS REACHED THE END OF THE PATH?" to the player visually, or through suitable audio or audiovisual displays.

Figure 3D:
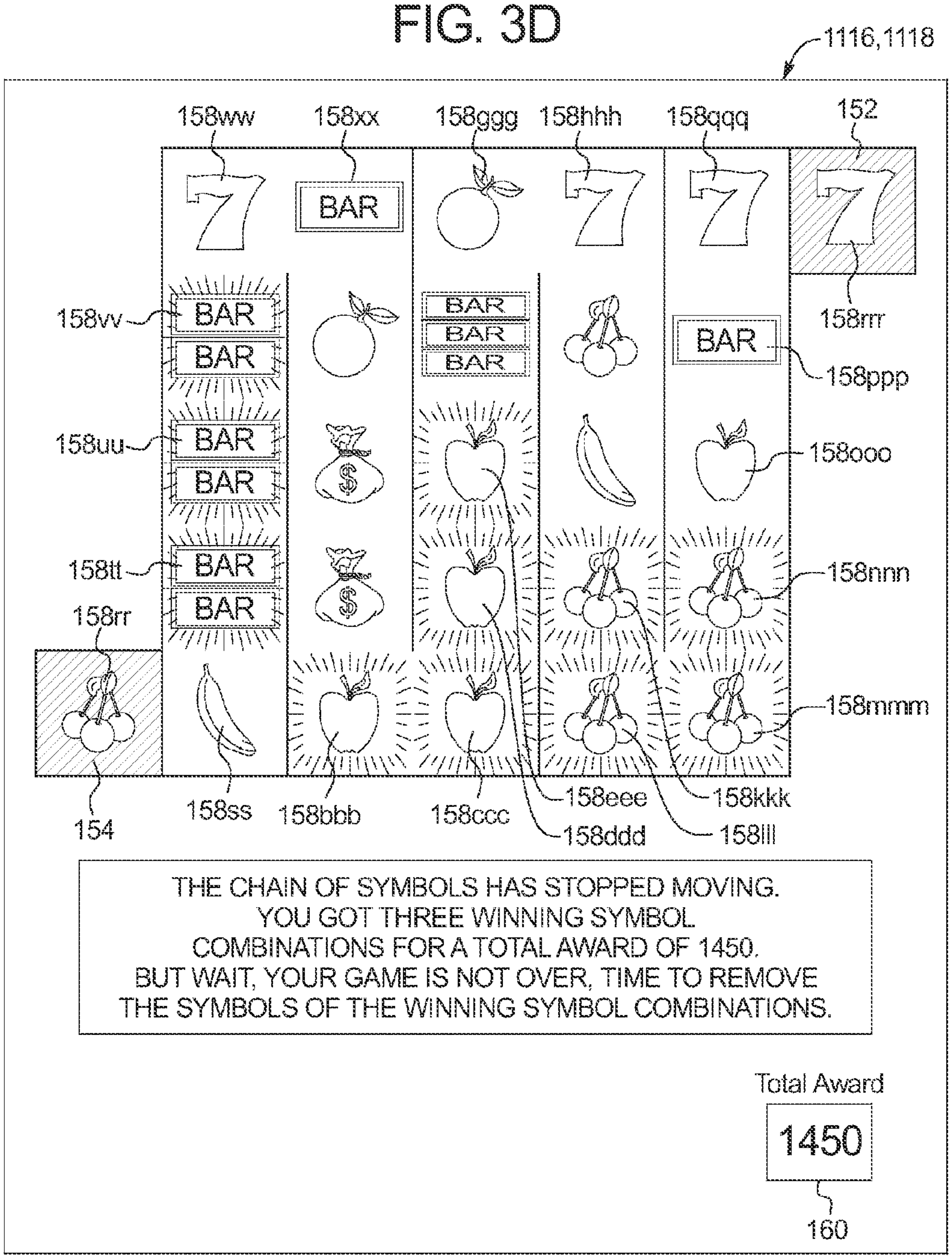

As seen in FIG. 3D, at a fourth, subsequent point in time, upon an occurrence of a symbol chain movement termination event, such as an elapsed amount of time or one or more player inputs, the gaming system stopped the movement of the chain of symbols through the path of symbol display positions. At this point in time, the gaming system displays the different symbols which will be evaluated for any award determinations. Specifically, the gaming system determined that: (i) the double-bar symbol 158*tt*—double bar symbol 158*uu*—double bar symbol 158*vv* is a winning symbol combination associated with an award of one-hundred-fifty credits, (ii) the apple symbol 158*bbb*—apple symbol 158*ccc*—apple symbol 158*ddd*—apple symbol 158*eee* is a winning symbol combination associated with an award of four-hundred credits, and (iii) the cherry symbol 158*kkk*—cherry symbol 158*lll*—cherry symbol 158*mmm*—cherry symbol 158*nnn* is a winning symbol combination associated with an award of nine-hundred credits. Accordingly, for this population of the path of symbol display positions, the gaming system removed three winning symbol combinations and provided the player a total award of one-thousand-four-hundred-fifty credits (as indicated in the total award meter 160). In this example, the gaming system provides appropriate messages such as "THE CHAIN OF SYMBOLS HAS STOPPED MOVING", "YOU GOT THREE WINNING SYMBOL COMBINATIONS FOR A TOTAL AWARD OF 1450" and "BUT WAIT, YOUR GAME IS NOT OVER, TIME TO REMOVE THE SYMBOLS OF THE WINNING SYMBOL COMBINATIONS" to the player visually, or through suitable audio or audiovisual displays.

Figure 3E:
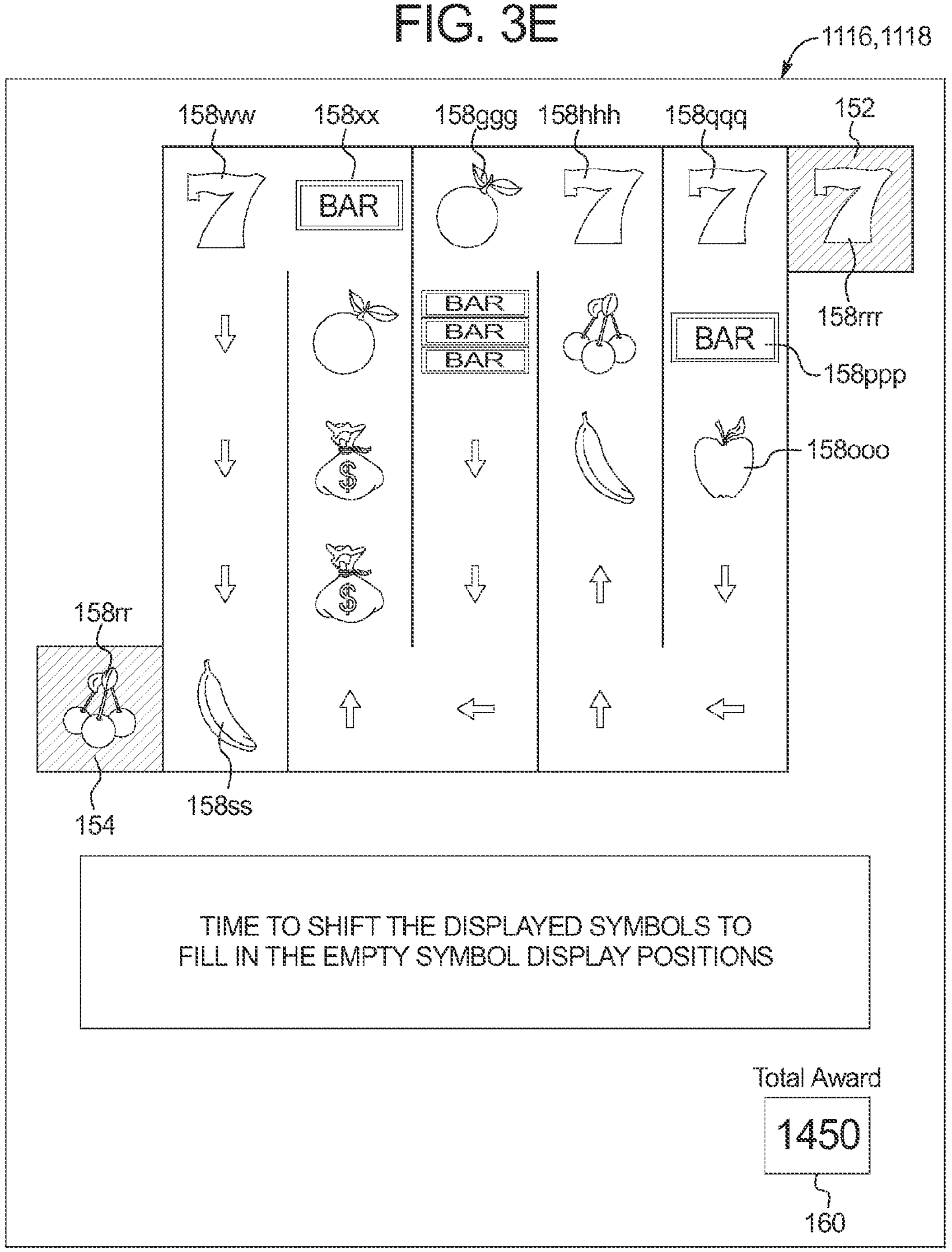

As seen in FIG. 3E, following providing the player the awards associated with the three winning symbol combinations, the gaming system: (i) removed the symbols of the double-bar symbol 158*tt*—double bar symbol 158*uu*—double bar symbol 158*vv* winning symbol combination, (ii) removed the symbols of the apple symbol 158*bbb*—apple symbol 158*ccc*—apple symbol 158*ddd*—apple symbol 158*eee* winning symbol combination, and (iii) removed the symbols of the cherry symbol 158*kkk*—cherry symbol 158*lll*—cherry symbol 158*mmm*—cherry symbol 158*nnn* winning symbol combination. Such removal left a plurality of the symbol display positions of the path empty. In this example, the gaming system provides appropriate messages such as "TIME TO SHIFT THE DISPLAYED SYMBOLS TO FILL IN THE EMPTY SYMBOL DISPLAY POSITIONS" to the player visually, or through suitable audio or audiovisual displays.

Figure 3F:
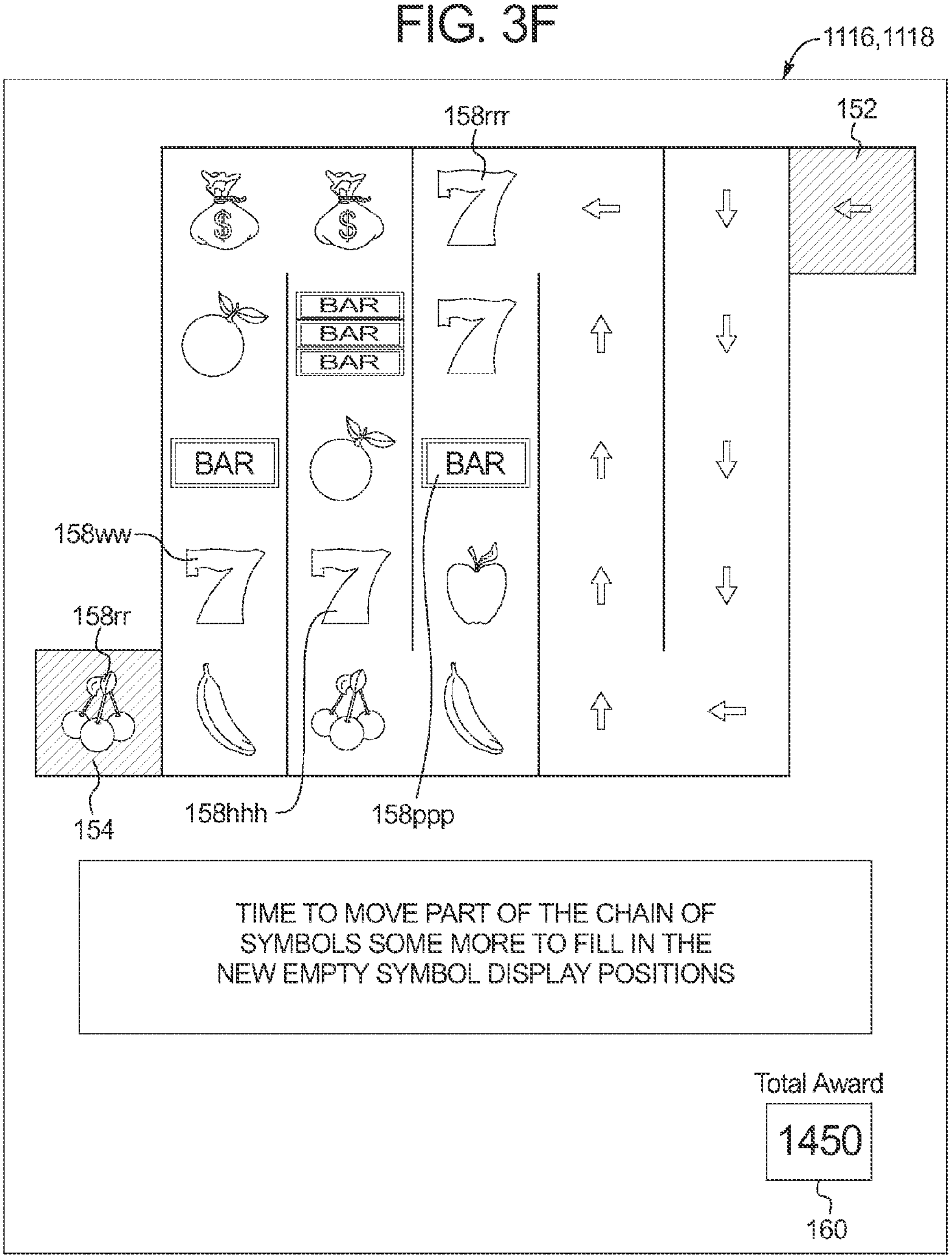

As seen in FIG. 3F, the gaming system then shifts one or more of the remaining, displayed symbols of the chain to fill in or populate the symbol display positions left empty by the removal of the symbols from the winning symbol combinations. Such shifting results in different symbol display position becoming empty. In this example, the gaming system provides appropriate messages such as "TIME TO MOVE PART OF THE CHAIN OF SYMBOLS SOME MORE TO FILL IN THE NEW EMPTY SYMBOL DISPLAY POSITIONS" to the player visually, or through suitable audio or audiovisual displays.

Figure 3G:
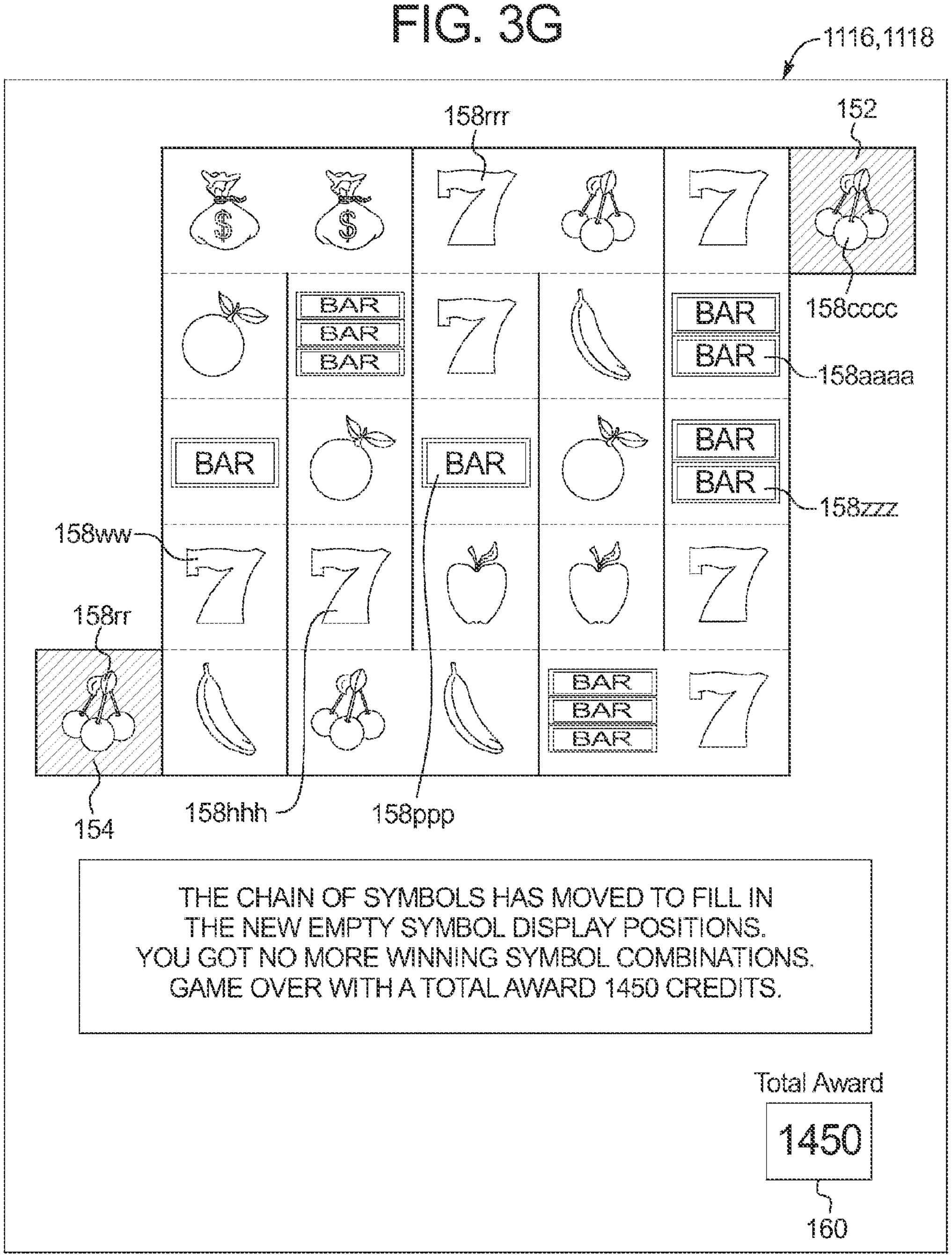

As seen in FIG. 3G, the gaming system proceeds with moving part of the chain of symbols in the direction of movement to repopulate the newly created empty symbol display positions. Following this movement of the chain of symbols, the gaming system determines that no more winning symbol combinations are displayed and thus the gaming system ends the play of the game. In this example, the gaming system provides appropriate messages such as "THE CHAIN OF SYMBOLS HAS MOVED TO FILL IN THE NEW EMPTY SYMBOL DISPLAY POSITIONS", "YOU GOT NO MORE WINNING SYMBOL COMBINATIONS" and "GAME OVER WITH A TOTAL AWARD 1450 CREDITS" to the player visually, or through suitable audio or audiovisual displays.

In one embodiment, the gaming system moves the chain of symbols through the symbol display positions of the path until the first displayed symbol in the chain reaches the ending symbol display position (or reaches a designated symbol display position having a predetermined relationship to the ending symbol display position). In another embodiment, the gaming system moves the chain of symbols through the symbol display positions of the path until a designated displayed symbol in the chain, such as the fifteenth displayed symbol in the chain, reaches the ending symbol display position (or reaches a designated symbol display position having a predetermined relationship to the ending symbol display position). In another embodiment, the gaming system moves the chain of symbols through the symbol display positions of the path until a designated period of time has elapsed. In another embodiment, the gaming system stops the symbols moving to correspond with a randomly generated game outcome. In another embodiment, the gaming system moves the chain of symbols through the path of symbol display positions such that at least one of the symbol display positions does not display any symbol when the gaming system stops the chain of symbols.

In another embodiment, the gaming system stops the symbols moving in association with one or more inputs from the player, such as a stop symbol movement input from the player. In this embodiment, if the player does not make the necessary input(s) in a designated period of time to stop the movement of the chain of symbols, as described above, the gaming system stops the movement of the chain of symbols through the symbol display positions of the formed path. Thus, this embodiment employs one or more aspects of player skill in determining when to stop the chain of symbol's movement and thus this embodiment employs one or more aspects of player skill in determining the outcome (and any associated award) of the streaming symbols game disclosed herein. That is, because the path of symbol display positions includes each of the displayed symbol display positions, the player can see the entire window of symbols updating as the chain of symbols moves through the path of symbol display positions. Accordingly, the player analyzes the window of symbols and, prior to the player's time being up and the gaming system stopping the movement of the chain, the player decides when to stop the chain of symbols when the player believes the symbols displayed along the path of symbol display positions (i.e., the symbols currently displayed in the window of symbols) correspond to a favorable outcome. Such a decision provides an offer and acceptance aspect to the streaming symbols game disclosed herein.

In another embodiment, the gaming system enables the player to make one or more designated inputs to determine the direction of movement of the chain of symbols. In one such embodiment, the gaming system enables the player to make a plurality of inputs regarding the direction of movement of the chain of symbols during the same play of the game. For example, the gaming system enables the player to move the chain of symbols toward the ending symbol display position (i.e., forward) and away from the ending symbol display position (i.e., in reverse) one or more times during the play of the game. This embodiment, combined with the above-described embodiment which enables the player to determine when to stop the movement of the chain of symbols, enables the player to utilize a degree of play skill in attempting to obtain a specific symbol outcome.

In another embodiment, one or more of the symbol display positions of the path cause a modification to the symbols of the chain which pass through such symbol display positions. In one such embodiment, a designated symbol display position displays each symbol of the chain (which is located at that symbol display position) as a wild symbol. In another such embodiment, a designated symbol display position displays each symbol of the chain (which is located at that symbol display position) as a bonus symbol. In one another embodiment, a designated symbol display position displays each symbol of the chain (which is located at that symbol display position) as a modifier symbol (e.g., a multiplier symbol).

In another embodiment wherein one or more of the symbol display positions of the path cause a modification to the symbols of the chain which pass through such symbol display positions, the modification of such symbols is a static modification which does not change from play to play of the game. In another embodiment wherein one or more of the symbol display positions of the path cause a modification to the symbols of the chain which pass through such symbol display positions, the gaming system randomly determines which of a plurality of modifications to apply to such symbols. It should be appreciated that certain of such embodiments include the above-described removal and replacement of one or more symbols of the chain of symbols while certain of such embodiments do not include the above-described removal and replacement of one or more symbols of the chain of symbols.

In another embodiment, one or more of the symbol display positions of the path are associated with designated symbols of the chain. In this embodiment, if a symbol display position of the path displays a designated symbol (which is associated with that symbol display position) of the stopped chain, the gaming system triggers one or more features. For example, if the gaming system stops the movement of the chain of symbols such that a specific symbol display position displays a specific symbol, the gaming system triggers a bonus game. In another example, if the gaming system stops the movement of the chain of symbols such that a specific symbol display position displays a specific symbol, the gaming system modifies the displayed specific symbol to function as a wild symbol.

Figure 4A:
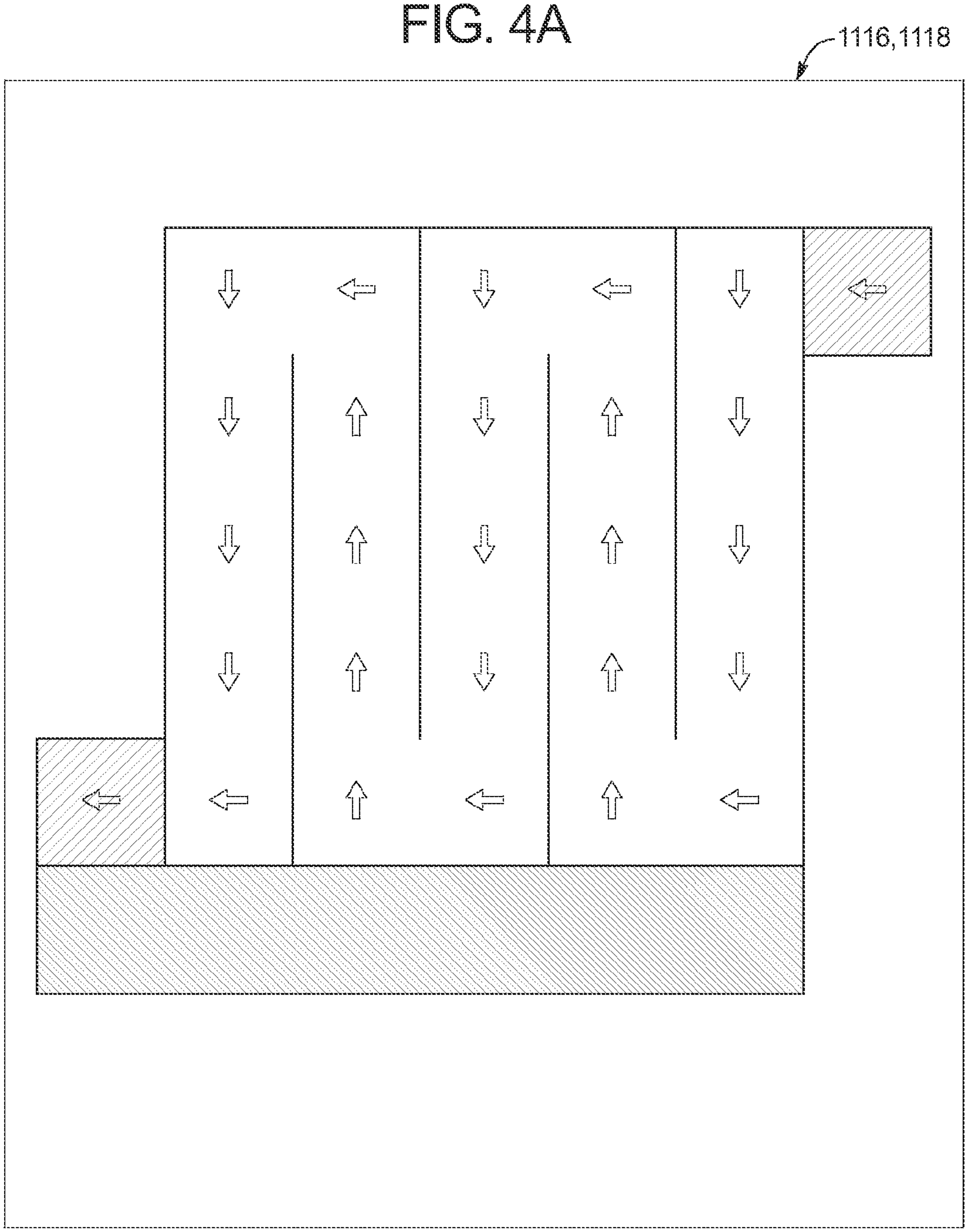
FIGS. 4A and 4B are front views of one embodiment of the gaming system disclosed herein illustrating a modification of the quantity of symbol display positions of the formed path.
Figure 4B:
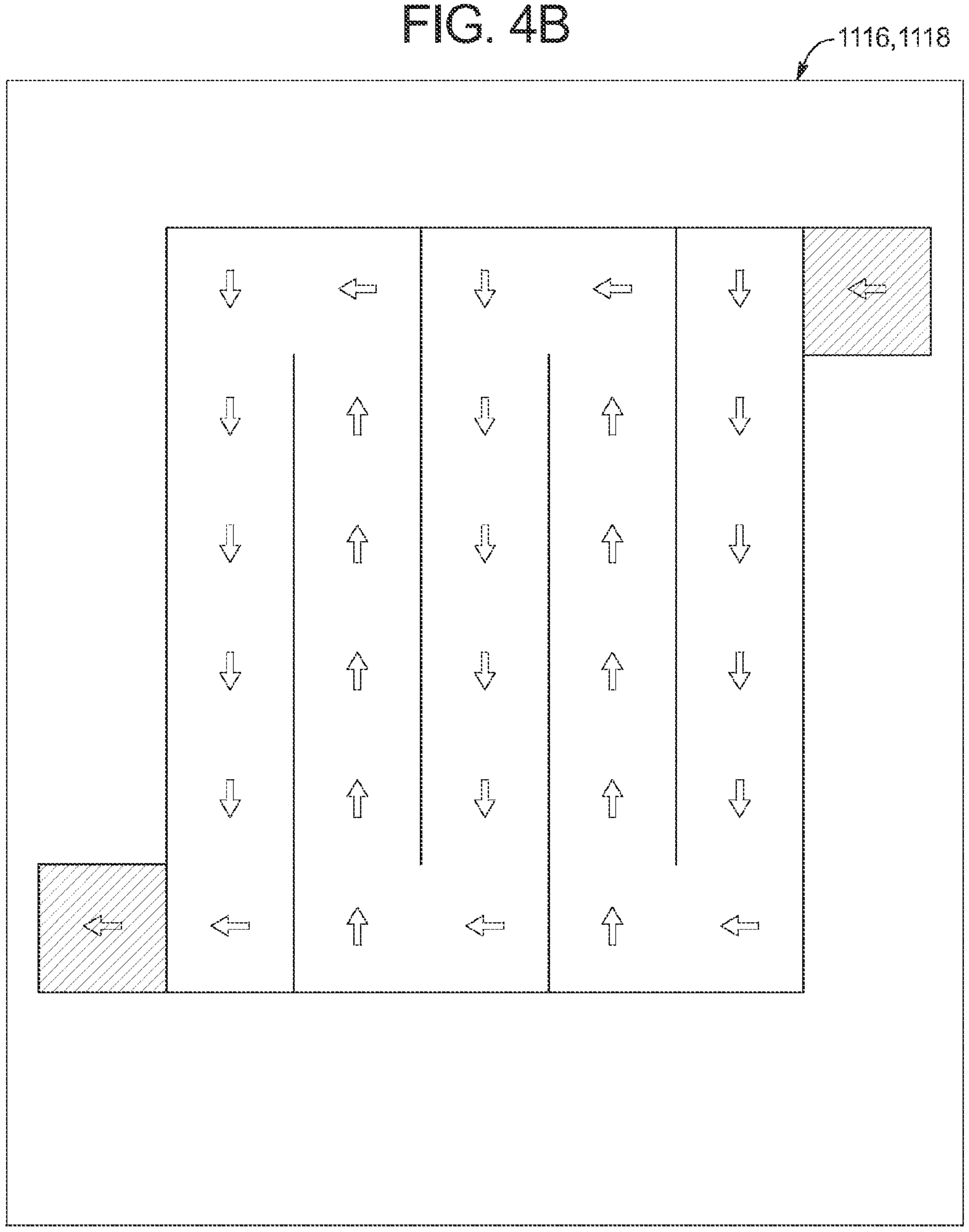

In another embodiment, the gaming system randomly modifies the quantity of symbol display positions in the path. In one such embodiment, upon a path modification event occurring, the gaming system increases the quantity of symbol display positions of the path (and accordingly moves the chain of symbols to populate these additional symbol display positions of the path). In one such embodiment, as seen in FIGS. 4A and 4B, the gaming system randomly determines to add a quantity of symbol display positions to the path. Such a modification increases the quantity of symbols of the chain which are displayed to the player at any point in time and thus increases the chances of such symbols being associated with an award or one or more features.

In another embodiment, the gaming system forms a path of symbol display positions with a plurality of starting symbol display positions. In this embodiment, the gaming system randomly determines which of the starting symbol display positions to utilize for a play of a game. In another embodiment, in addition or as an alternative to forming a path of symbol display position with a plurality of starting symbol display positions, the gaming system forms a path of symbol display positions with a plurality of ending symbol display positions. In this embodiment, the gaming system randomly determines which of the ending symbol display positions to utilize for a play of a game. It should be appreciated that in these embodiments, the gaming system's determination of which starting display position and/or which ending symbol display position to utilize determine the direction of movement of the chain of symbols through the path.

In another embodiment, the gaming system determines which end of the chain of symbols to utilize as a leading end. That is, since the chain of symbols includes a symbol at each end, the gaming system determines, for one or more plays of the streaming symbols game, which end of the chain of symbols to use as a leading end (i.e., which end of the chain enters the path of symbol display positions first). It should be appreciated that such a determination affects which symbols are displayed at the symbol display positions of the path at different points in time and thus affects which awards the gaming system provides to the player.

In another embodiment, the gaming system simultaneously displays a plurality of paths of symbol display positions and a plurality of chains of symbols associated with such paths. In this embodiment, each path of symbol display positions (and the chain of symbols associated with that path) are distinct from each other with no interaction between the paths or symbols of the path. In another embodiment, two or more of the paths (and the chains of symbols associated with such paths) interact with each other. In one such embodiment, the at least two paths overlap such that the gaming system simultaneously displays one or more symbols at each of the paths of symbol display positions. In another such embodiment, the gaming system transfers one or more symbols of one chain of symbols associated with one path to another chain of symbols associated with another path.

In one embodiment, the gaming system causes at least one display device of the player's gaming device to display the streaming symbols game. In another embodiment, in addition or in alternative to each gaming device displaying the streaming symbols game, the gaming system causes one or more community or overhead display devices to display part or all of the streaming symbols game to one or more other players or bystanders either at a gaming establishment or viewing over a network, such as the internet. In another embodiment, the gaming system displays the symbols streaming across the display devices of multiple adjacent gaming devices. In different embodiments, the gaming system determines one or more bonus awards based on such multi-gaming device streaming symbols, such as a bonus award based on a sum total of each evaluation of the symbols which stream across the display devices of multiple gaming devices or a bonus award based on an accumulated quantity of symbols across the display devices of multiple gaming machines.

In another embodiment, in addition or in alternative to each gaming device displaying the streaming symbols game, the gaming system causes one or more internet sites to each display the streaming symbols game such that a player is enabled to log on from a personal web browser. In another such embodiment, the gaming system enables the player to play one or more primary games on one device while viewing the streaming symbols game from another device. For example, the gaming system enables the player to play one or more primary games on a mobile phone while viewing the status of the streaming symbols game on a desktop or laptop computer.

In another embodiment, as mentioned above, a streaming symbols game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a streaming symbols game triggering event to occur.

In another embodiment, as also mentioned above, the gaming system does not provide any apparent reasons to the players for a streaming symbols game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, a streaming symbols game triggering event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a streaming symbols game triggering event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a streaming symbols game triggering event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a streaming symbols game triggering event occurs, based on a quantity of games played. In this embodiment, a quantity of games played is set for when one or more of such events or conditions will occur. In one embodiment, such a set quantity of games played is based on historic data.

In another alternative embodiment, a streaming symbols game triggering event occurs, based on time. In this embodiment, a time is set for when one or more of such events or conditions will occur. In one embodiment, such a set time is based on historic data.

In another alternative embodiment, a streaming symbols game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a streaming symbols game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a streaming symbols game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a streaming symbols game triggering event to occur may be implemented in accordance with the gaming system and method disclosed herein.

It should be appreciated that any of the above-described streaming symbols game triggering events may be combined in one or more different embodiments.

Alternative Embodiments

It should be appreciated that in different embodiments, one or more of:

i. a quantity of symbol display positions in a formed path;
ii. a formation of a path of symbol display positions;
iii. which path of symbol display positions to display;
iv. a shape or configuration of the path of symbol display positions;
v. a direction of movement of the chain of symbols through the path;
vi. when to stop the movement of the chain of symbols through the path (i.e., when a symbol chain movement termination event occurs);
vii. a speed which to move the chain of symbols through the path;
viii. which symbol display position of the path will function as a starting symbol display position;
ix. which symbol display position of the path will function as a ending symbol display position;
x. whether to enable a player to make any inputs to stop the movement of the chain of symbols through the path;
xi. whether to enable a player to make any inputs to change the direction of movement of the chain of symbols through the path;
xii. which displayed symbols of the chain are removed;
xiii. which displayed symbols of the chain are shifted;
xiv. which displayed symbols of the chain retain their original positioning;
xv. a quantity of displayed symbols of the chain which are removed from the path;
xvi. a direction of any shifting of any symbols;
xvii. a quantity of any symbol display positions of the path that modify the symbols displayed at or which pass through such symbol display positions;
xviii. which of any symbol display positions of the path modify the symbols displayed at or which pass through such symbol display positions;
xix. whether to modify the quantity of symbol display positions of the path (i.e., whether a path modification event occurs);
xx. a quantity of symbol display positions of the path to add or subtract;
xxi. which symbols of the chain are associated with which symbol display positions of the path; and
xxii. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a “gaming system” as used herein refers to various configurations of: (a) one or more central servers, central controllers, or remote hosts; (b) one or more electronic gaming machines (“EGMs”); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an “EGM.” Additionally, for brevity and clarity, unless specifically stated otherwise, “EGM” as used herein represents one EGM or a plurality of EGMs, and “central server, central controller, or remote host” as used herein represents one central server, central controller, or remote host or a plurality of central servers, central controllers, or remote hosts.

Figure 5A:
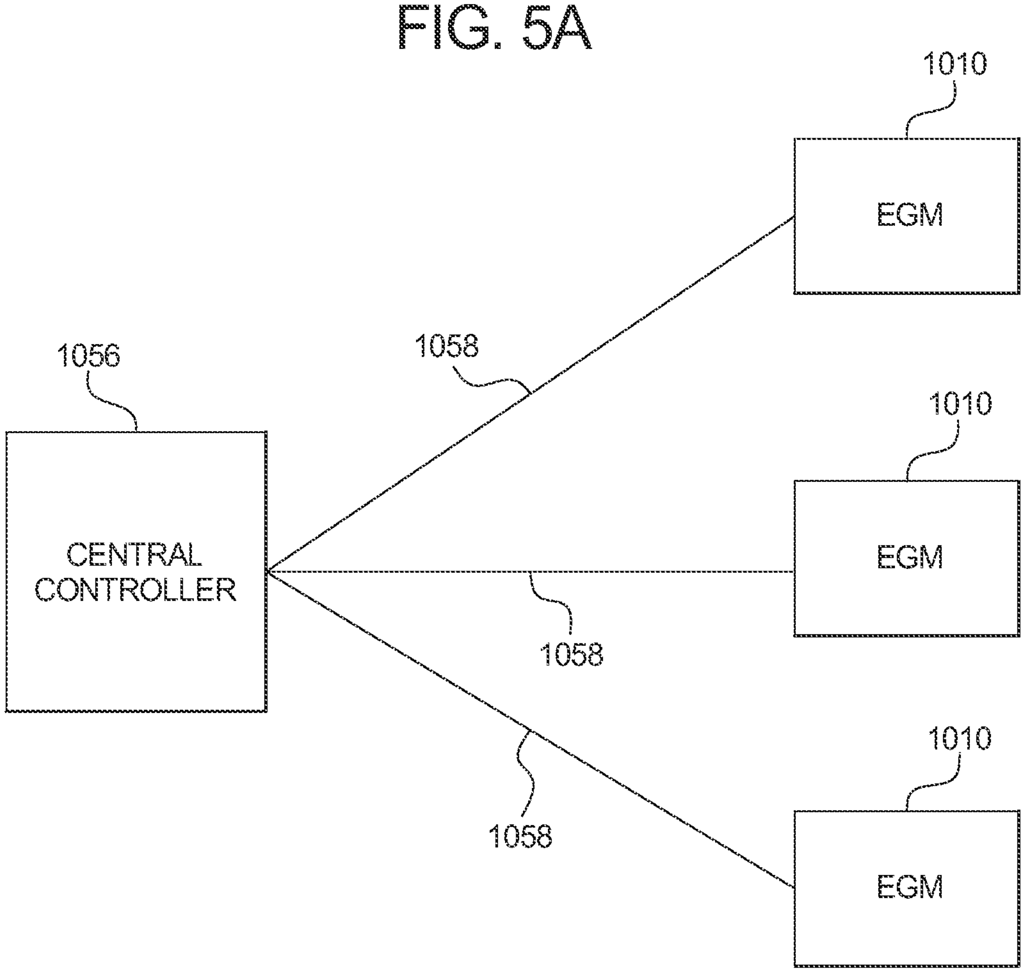
FIG. 5A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 5A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such “thin client” embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such “thick client” embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the Internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5B:
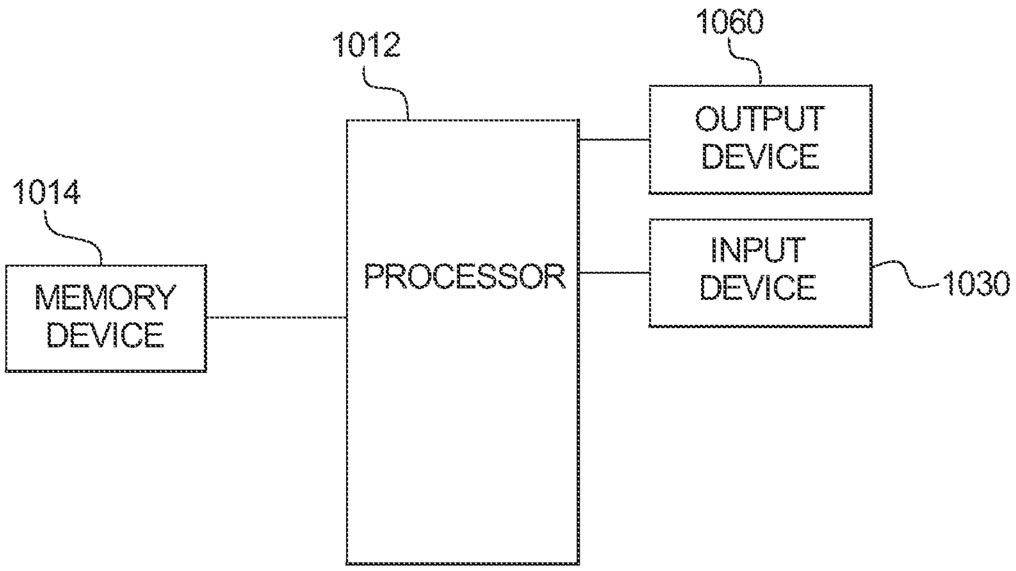
FIG. 5B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 5B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 5B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 6A:
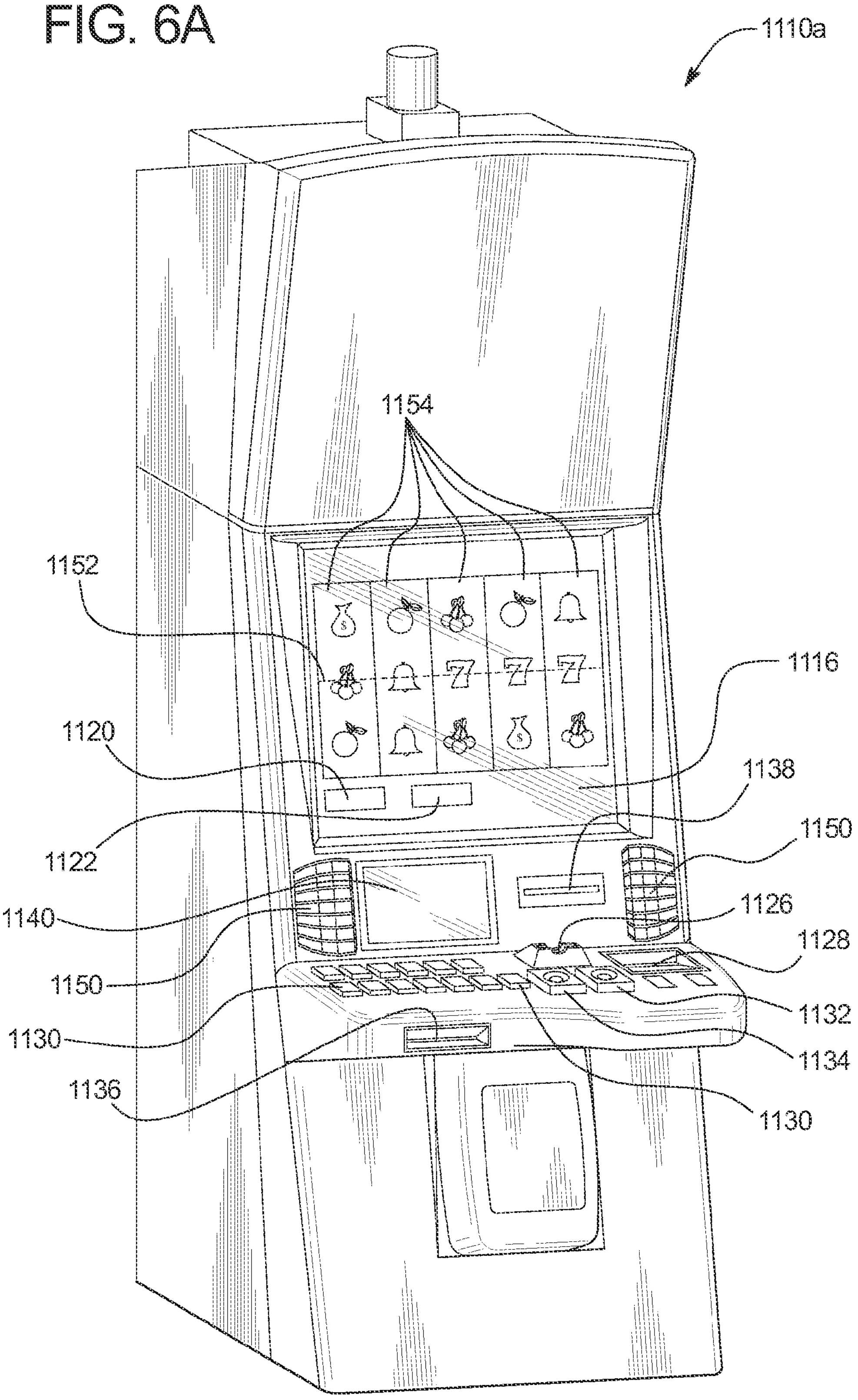
FIGS. 6A and 6B are perspective views of example alternative embodiments of the gaming system disclosed herein.
Figure 6B:
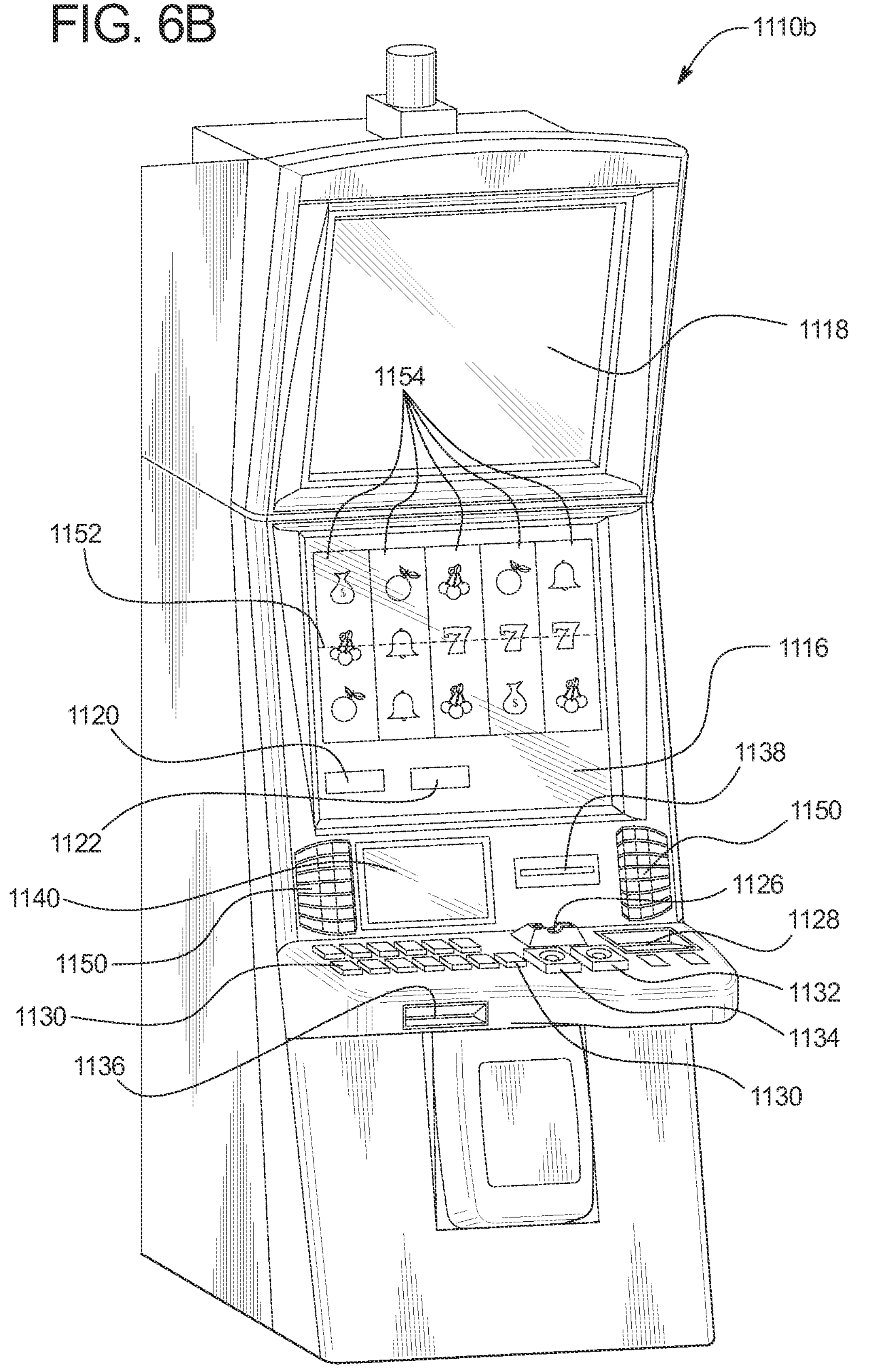

In various embodiments, the EGM includes one or more input devices. The input devices may include any suitable device that enables an input signal to be produced and received by the at least one processor of the EGM. The example EGM illustrated in FIG. 5B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 6A and 6B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 6A and 6B each include a card reader 1138. The card reader is configured to read a player identification card inserted into the card reader.

In various embodiments, the EGM includes one or more output devices. The example EGM illustrated in FIG. 5B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 6A includes a central display device 1116, a player tracking display 1140, a credit display 1120, and a bet display 1122. The example EGM illustrated in FIG. 6B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 6A and 6B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 6A and 6B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pods or sets. The gaming system flags or marks the selected game outcome and/or award as used. Once a game outcome or an award is flagged as used, it is prevented from further selection from its respective pod or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 6A and 6B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the players anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device, for a play of a game, to:

(a) display a path of a plurality of symbol display positions, said path associated with a single chain of symbols including a plurality of different symbols, (b) at each of the plurality of symbol display positions of the path, display one of the symbols of the single chain of symbols, (c) determine if any of the displayed symbols form any winning symbol combinations, and (d) if a plurality of the displayed symbols form at least one winning symbol combination:

(i) display an award for each displayed winning symbol combination, (ii) remove at least one displayed symbol from at least one displayed winning symbol combination, (iii) for each of any symbols removed from a first portion of the path of symbol display positions, reposition at least one of the displayed symbols to another one of the symbol display positions to create at least one empty symbol display position of a second portion of the path of symbol display positions, (iv) for each created empty symbol display position of the second portion of the path of symbol display positions, display one of the symbols of the single chain of symbols, and (v) repeat (c) to (d) at least once.

2. The gaming system of claim 1, wherein when executed by the at least one processor, the plurality of instructions cause the at least one processor to:

display the single chain of symbols moving through the path of symbol display positions, and display the single chain of symbols stopping to display one of the symbols of the single chain of symbols at each of the plurality of symbol display positions of the path.

3. The gaming system of claim 2, wherein when executed by the at least one processor, the plurality of instructions cause the at least one processor to enable a player to make an input to stop the movement of the single chain of symbols through the path of symbol display positions.

4. The gaming system of claim 2, wherein when executed by the at least one processor, the plurality of instructions cause the at least one processor to enable a player to make an input to modify a direction of movement of the single chain of symbols through the path of symbol display positions.

5. The gaming system of claim 1, wherein the path of symbol display positions forms a matrix configuration including a plurality of rows of symbol display positions and a plurality of columns of symbol display positions.

6. The gaming system of claim 1, wherein when executed by the at least one processor, the plurality of instructions cause the at least one processor to randomly determine the displayed path of symbol display positions.

7. The gaming system of claim 1, wherein when executed by the at least one processor, the plurality of instructions cause the at least one processor to modify at least one symbol of the chain of symbols when said symbol is displayed at a designated one of the symbol display positions of the path.

8. The gaming system of claim 1, wherein when executed by the at least one processor, the plurality of instructions cause the at least one processor to, for the play of the game, modify a quantity of the plurality of symbol display positions of the path after (a).

9. The gaming system of claim 1, wherein when executed by the at least one processor if the plurality of the displayed symbols form at least one winning symbol combination, the plurality of instructions cause the at least one processor to repeat (c) to (d) until no winning symbol combinations are displayed.

10. A method of operating a gaming system, for a play of a game, said method comprising:

(a) causing at least one display device to display a path of a plurality of symbol display positions, said path associated with a single chain of symbols including a plurality of different symbols;

(b) at each of the plurality of symbol display positions of the path, causing the at least one display device to display one of the symbols of the single chain of symbols;

(c) causing at least one processor to execute a plurality of instructions to determine if any of the displayed symbols form any winning symbol combinations; and (d) if a plurality of the displayed symbols form at least one winning symbol combination:

(i) causing the at least one display device to display an award for each displayed winning symbol combination, (ii) causing the at least one processor to execute the plurality of instructions to remove at least one displayed symbol from at least one displayed winning symbol combination, (iii) for each of any symbols removed from a first portion of the path of symbol display positions, causing the at least one processor to execute the plurality of instructions to reposition at least one of the displayed symbols to another one of the symbol display positions to create at least one empty symbol display position of a second portion of the path of symbol display positions, (iv) for each created empty symbol display position of the second portion of the path of symbol display positions, causing the at least one display device to display one of the symbols of the single chain of symbols, and (v) repeating (c) to (d) at least once.

11. The method of claim 10, which includes:

causing the at least one display device to display the single chain of symbols moving through the path of symbol display positions, and causing the at least one display device to display the single chain of symbols stopping to display one of the symbols of the single chain of symbols at each of the plurality of symbol display positions of the path.

12. The method of claim 11, which includes enabling a player to make an input to stop the movement of the single chain of symbols through the path of symbol display positions.

13. The method of claim 11, which includes enabling a player to make an input to modify a direction of movement of the single chain of symbols through the path of symbol display positions.

14. The method of claim 10, wherein the path of symbol display positions forms a matrix configuration including a plurality of rows of symbol display positions and a plurality of columns of symbol display positions.

15. The method of claim 10, which includes causing the at least one processor to execute the plurality of instructions to randomly determine the displayed path of symbol display positions.

16. The method of claim 10, which includes causing the at least one processor to execute the plurality of instructions to modify at least one symbol of the chain of symbols when said symbol is displayed at a designated one of the symbol display positions of the path.

17. The method of claim 10, which include, for the play of the game, causing the at least one processor to execute the plurality of instructions to modify a quantity of the plurality of symbol display positions of the path after (a).

18. The method of claim 10, which includes repeating (c) to (d) until no winning symbol combinations are displayed if the plurality of the displayed symbols form at least one winning symbol combination.

19. The method of claim 10, which is provided through a data network.

20. The method of claim 19, wherein the data network is the internet.

21. A non-transitory computer readable medium including a plurality of instructions, which when executed by at least one processor, cause the at least one processor, for a play of a game, to:

(a) cause at least one display device to display a path of a plurality of symbol display positions, said path associated with a single chain of symbols including a plurality of different symbols;

(b) at each of the plurality of symbol display positions of the path, cause the at least one display device to display one of the symbols of the single chain of symbols;

(c) determine if any of the displayed symbols form any winning symbol combinations; and (d) if a plurality of the displayed symbols form at least one winning symbol combination:

(i) cause the at least one display device to display an award for each displayed winning symbol combination, (ii) remove at least one displayed symbol from at least one displayed winning symbol combination, (iii) for each of any symbols removed from a first portion of the path of symbol display positions, reposition at least one of the displayed symbols to another one of the symbol display positions to create at least one empty symbol display position of a second portion of the path of symbol display positions, (iv) for each created empty symbol display position of the second portion of the path of symbol display positions, cause the at least one display device to display one of the symbols of the single chain of symbols, and (v) repeat (c) to (d) at least once.

22. The non-transitory computer readable medium of claim 21, wherein when executed by the at least one processor, the plurality of instructions cause the at least one processor to:

cause the at least one display device to display the single chain of symbols moving through the path of symbol display positions, and cause the at least one display device to display the single chain of symbols stopping to display one of the symbols of the single chain of symbols at each of the plurality of symbol display positions of the path.

23. The non-transitory computer readable medium of claim 21, wherein when executed by the at least one processor, the plurality of instructions cause the at least one processor to enable a player to make an input to stop the movement of the single chain of symbols through the path of symbol display positions.

24. The non-transitory computer readable medium of claim 21, wherein when executed by the at least one processor, the plurality of instructions cause the at least one processor to enable a player to make an input to modify a direction of movement of the single chain of symbols through the path of symbol display positions.

25. The non-transitory computer readable medium of claim 21, wherein the path of symbol display positions forms a matrix configuration including a plurality of rows of symbol display positions and a plurality of columns of symbol display positions.

26. The non-transitory computer readable medium of claim 21, wherein when executed by the at least one processor, the plurality of instructions cause the at least one processor to randomly determine the displayed path of symbol display positions.

27. The non-transitory computer readable medium of claim 21, wherein when executed by the at least one processor, the plurality of instructions cause the at least one processor to modify at least one symbol of the chain of symbols when said symbol is displayed at a designated one of the symbol display positions of the path.

28. The non-transitory computer readable medium of claim 21, wherein when executed by the at least one processor, the plurality of instructions cause the at least one processor to, for the play of the game, modify a quantity of the plurality of symbol display positions of the path after (a).

29. The non-transitory computer readable medium of claim 21, wherein when executed by the at least one processor if the plurality of the displayed symbols form at least one winning symbol combination, the plurality of instructions cause the at least one processor to repeat (c) to (d) until no winning symbol combinations are displayed.

* * * * *